(12) United States Patent
Nishimura

(10) Patent No.: US 7,076,800 B2
(45) Date of Patent: Jul. 11, 2006

(54) IC CARD TERMINAL UNIT AND IC CARD DUPLICATION METHOD

(75) Inventor: Saori Nishimura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 827 days.

(21) Appl. No.: 09/976,050

(22) Filed: Oct. 15, 2001

(65) Prior Publication Data

US 2002/0114468 A1   Aug. 22, 2002

(30) Foreign Application Priority Data

Feb. 20, 2001   (JP) .............................. 2001-043630

(51) Int. Cl.
H04L 9/00   (2006.01)
(52) U.S. Cl. .......................................... 726/9; 380/278
(58) Field of Classification Search ................ 713/171, 713/173, 175; 380/278, 279, 44, 282–284; 726/9, 20

See application file for complete search history.

(56) References Cited

U.S. PATENT DOCUMENTS

| | | | |
|---|---|---|---|
| 5,193,114 A | | 3/1993 | Moseley |
| 6,009,174 A | * | 12/1999 | Tatebayashi et al. ........ 380/277 |
| 6,230,267 B1 | * | 5/2001 | Richards et al. ............ 713/172 |
| 6,351,813 B1 | * | 2/2002 | Mooney et al. ............. 713/185 |

FOREIGN PATENT DOCUMENTS

| | | |
|---|---|---|
| DE | 196 29 856 | 1/1998 |
| FR | 2 681 165 A1 | 3/1993 |
| JP | 11 219291 | 8/1999 |
| JP | 2000-268137 | 9/2000 |
| WO | WO 83/03018 | 9/1983 |
| WO | WO 01/18807 | 3/2001 |

OTHER PUBLICATIONS

Telesystems, Jan. 10, 2001, "Smartcard Copier User's Guide" V 1.0.*
ISO 7816-4, "Smart Card Standard: Interindustry Commands for Interchange", 1999-2006.*
ISO 7816-3, "Smart Card Standard: Electronic Signals and Transmission Protocols", 1999-2006.*
Office Action, Dated Feb. 20, 2004 (English Translation Attached), for French Patent Application No. 2 681 165, upon which reliance is made for priority in this application.
Office Action, dated Mar. 30, 2004, from the Japanese Patent Office, for Patent Application No. 2001-046630.

* cited by examiner

Primary Examiner—Emmanuel L. Moise
Assistant Examiner—Thomas Ho
(74) Attorney, Agent, or Firm—Pillsbury Winthrop Shaw Pittman, LLP

(57) ABSTRACT

In the case of an IC card having a decoding key for decoding data and an encoding key for encoding the data which are generated inside or set by an external unit, when a key takeout instruction for taking out the decoding key and encoding key in the IC card to an external unit is input, the decoding key and encoding key are encoded by a plurality of other keys set in the IC card and then transmitted to an external unit.

5 Claims, 35 Drawing Sheets

FIG. 3A  Format 1  | Status code |

FIG. 3B  Format 2  | Data part | Status code |

| | Item 1:<br>kanji name | Item 2:<br>kanji address | Item 4:<br>Member's number | Item 5:<br>Expiration date | Item 6:<br>Password | Item 7:<br>Key 1 |
|---|---|---|---|---|---|---|
| Record #1 | Taro Tanaka | Nerima-ku | 000007 | 2000.09 | 737c54a87 | 93 24..d8 88 AB |
| Record #2 | Jiro Suzuki | Koto-ku | 000014 | 2001.10 | 4787ea7184 | d0 93.b2 cb 46 |
| ... | ... | ... | ... | ... | ... | ... |
| Record #13 | Saburo Hayashi | Shinjuku-ku | 000157 | 2005.08 | c8d7eb567f | 82 6a..eb 0b 87 |
| Record #14 | Shiro Matsumoto | Suginami-ku | 000004 | 2002.07 | 8181fc35d8 | 49 83.6c 44 78 |
| ... | ... | ... | ... | ... | ... | ... |
| Record #21 | Goro Nakamura | Shinagawa-ku | 002004 | 2000.12 | eefaac5620 | 35 89..fb f9 90 |

F I G. 6

| Instruction code | Contents of instruction code | Additional data | IC output information |
|---|---|---|---|
| Instruction code 1 | Contents of instruction code 1 | × | 90 00 |
| Instruction code 2 | Contents of instruction code 2 | × | 90 00 |
| ...... | ...... | ...... | ...... |
| Instruction code 18 | Contents of instruction code 18 | Personal file : Item 6 | 90 00 |
| Instruction code 19 | Contents of instruction code 19 | Personal file : Item 7 | 90 00 |
| Instruction code 20 | Contents of instruction code 20 | × | 90 00 |
| ...... | ...... | ...... | ...... |
| Instruction code 25 | Contents of instruction code 25 | Personal file : Item 5 | 90 00 |
| ...... | ...... | ...... | ...... |
| Instruction code 30 | Contents of instruction code 30 | × | 90 00 |
| Instruction code 31 | Contents of instruction code 31 | × | 90 00 |
| ...... | ...... | ...... | ...... |

FIG. 7

| Instruction code | Contents of instruction code | Additional data | IC output information |
|---|---|---|---|
| Instruction code 1 | Contents of instruction code 1 | X | 90 00 |
| Instruction code 2 | Contents of instruction code 2 | X | 90 00 |
| ...... | ...... | ...... | ...... |
| Instruction code 18 | Contents of instruction code 18 | Personal file : Item 6 | 90 00 |
| Instruction code 19 | Contents of instruction code 19 | Personal file : Item 7 | 90 00 |

F I G. 8

| Contents of instruction code 19 | Additional data<br>49 83..6c 44 78 |
|---|---|

File name input screen

Input password and file name to be encoded in new card
   Password of backup card
   Password of new card

| Name | Folder name |
|---|---|
| Electronic data file 1.dat | c : ¥filebox |
| Electronic data file 2.txt | c : ¥filebox 1 |
| Electronic data file 3.bin | c : ¥filebox 2 |

Add
Delete

End of input   End

F I G. 18

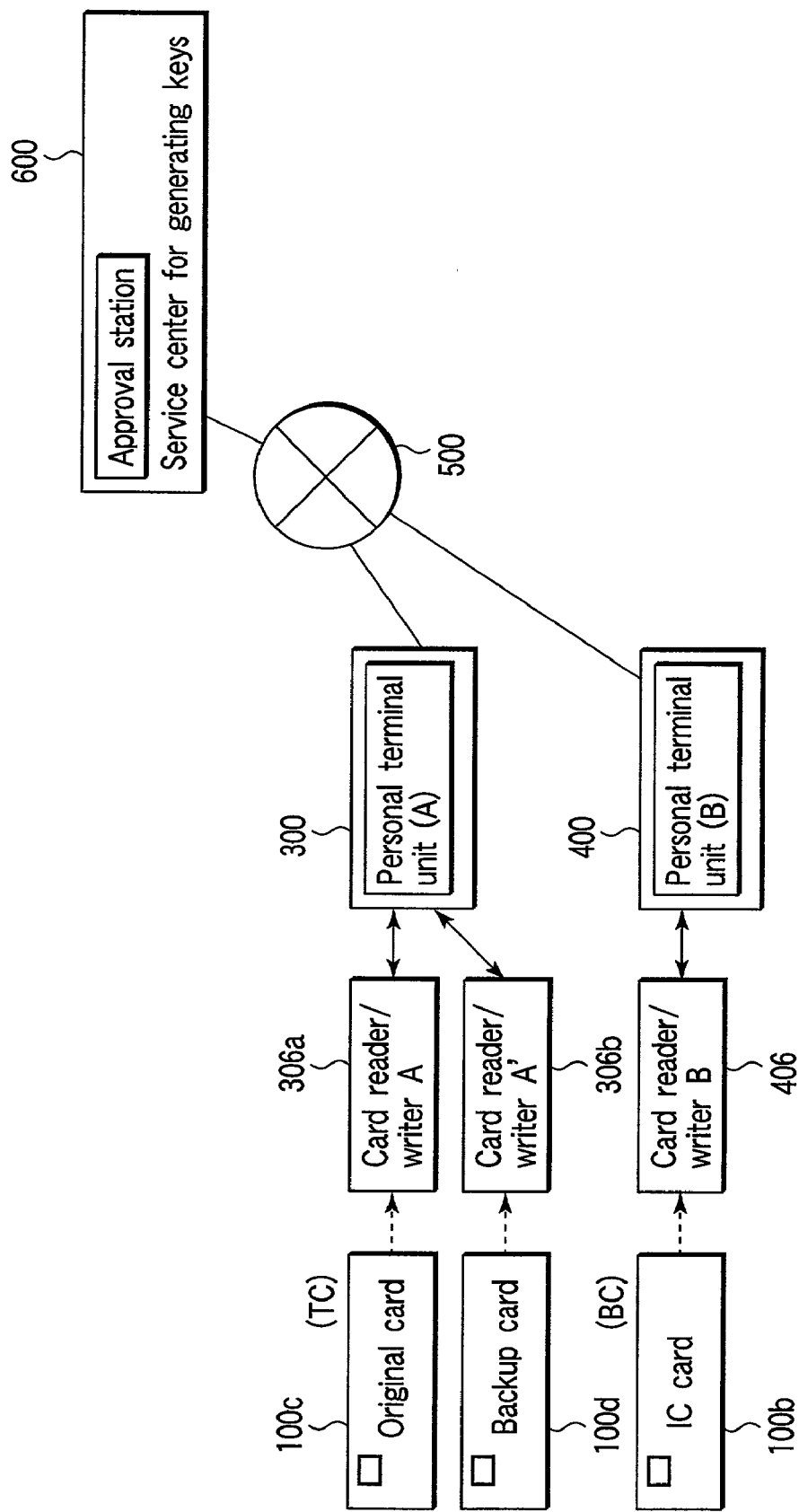
F I G. 28

IC CARD TERMINAL UNIT AND IC CARD DUPLICATION METHOD

CROSS-REFERENCE TO RELATED APPLICATIONS

This application is based upon and claims the benefit of priority from the prior Japanese Patent Application No. 2001-043630, filed Feb. 20, 2001, the entire contents of which are incorporated herein by reference.

BACKGROUND OF THE INVENTION

1. Field of the Invention

The present invention relates to an IC card terminal unit and an IC card duplication method for generating a duplicate card (e.g. backup card) of an IC card capable of encrypting a key for encoding or decoding data generated inside by another key and taking out the data to an external unit.

2. Field of the Related Art

The so-called IC card containing an IC chip having a nonvolatile data memory and a CPU (Central Processing Unit) for controlling the memory has been recently used in various fields of industry as a portable storage medium.

The IC card of this type is issued by using an IC-card issuing machine generally set in a card issuing company or the like. The IC-card issuing machine generates instruction data necessary for operating an IC card, magnetic encoding data, and printing data by a host computer, successively transmits these data to an issuing machine, inputs the instruction data to the IC chip in the IC card, and magnetically records and prints the magnetic encoding data and printing data on the surface of the IC card.

The processing to be executed in accordance with the instruction data to the IC chip in the IC card is one of the most important processings to issue the IC card. The IC chip in the IC card is provided with means for outputting the information about whether transmitted personal data is normally processed and the issuing machine is provided with means for determining whether the instruction data is normally transmitted in accordance with the information output from the IC chip.

Moreover, the IC card stores a plurality of keys for securing a high security in a data memory to confirm the concealment and validity of data by using the keys.

Furthermore, to improve the security of a plurality of personal computers connected to a network, a method for using an IC card is developed and moreover, a method is used which confirms the concealment of an electronic data file and the validity of data by using keys stored in an IC card.

Furthermore, to secure a higher security, a method is used which prevents a plurality of keys from leaking to external units when they are set by generating the keys by the CPU in an IC card.

However, a conventional IC card system for generating the above keys in an IC card has a problem that if the IC card is broken or lost, an electronic data file cannot be used in which concealment and validity are confirmed b using the keys generated in the IC card.

Moreover, if the keys generated in the IC card can be easily taken out to a unit outside of the IC card, a problem occurs that security is extremely deteriorated.

Therefore, the IC-card backup method disclosed in the official gazette of Jpn. Pat. Appln. KOKAI Publication No. 2000-268137 is recently considered. The IC-card backup method is an art for reissuing an IC card by duplicating the card information including the identification information for identifying a normal IC card from the normal IC card to a spare IC card, changing the above identification information to the content for using the spare IC card as the normal IC card according to necessity, and changing the spare IC card to the normal IC card.

However, the IC-card backup method does not duplicate a completely same IC card. Therefore, even by using the reissued IC card, it is impossible to solve the above-described problems.

BRIEF SUMMARY OF THE INVENTION

It is an object of the present invention to provide an IC card terminal unit and an IC card duplication method capable of safely taking out a key for encoding or decoding the data stored in an IC card to an external unit, storing the key in another IC card, and thereby easily generating a duplicate card (e.g. backup card) of the IC card.

An IC card terminal unit of the present invention comprises communication means for communicating data between two IC cards in one of which at least a key for encoding or decoding the data is stored and in the other of which the key is not stored, key takeout means for taking out the key from the former IC card through the communication means by transmitting a key takeout instruction to the former IC card in which the key is stored through the communication means, and encoding-key-setting means for storing the key in the latter IC card by transmitting an encoding-key-setting instruction to which the key taken out of the latter IC card is added to the latter IC card in which the key is not stored through the communication means.

Moreover, an IC card duplication method of the present invention uses a first IC card to be duplicated in which a key for encoding or decoding at least data, a second IC card for duplication, and a terminal unit for handling these first and second IC cards and comprises a fist step of transmitting a key takeout instruction from the terminal unit to the first IC card, a second step of receiving the key takeout instruction transmitted from the terminal unit in the first IC card and transmitting the key to the terminal unit, a third step of receiving the key transmitted from the first IC card and transmitting an encoding-key-setting instruction to which the received key is added to the second IC card, and a fourth step of receiving the encoding-key-setting instruction transmitted from the terminal unit and storing the key added to the encoding-key-setting instruction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIGS. 3A and 3B are illustrations showing response formats output from an IC card;

FIG. 6 is a block diagram showing a personal database file;

FIG. 7 is a block diagram showing a database file of instruction codes for an original card;

FIG. 8 is a block diagram showing a database file of instruction codes for a backup card;

FIG. 18 is an illustration showing a file-name input screen;

FIG. 28 is a block diagram schematically showing a configuration of a system for setting an encoding key and a decoding key to an issued original card and setting a decoding key to a backup card in still another example;

DETAILED DESCRIPTION OF THE INVENTION

An embodiment of the present invention is described below by referring to the accompanying drawings.

Figure 1:
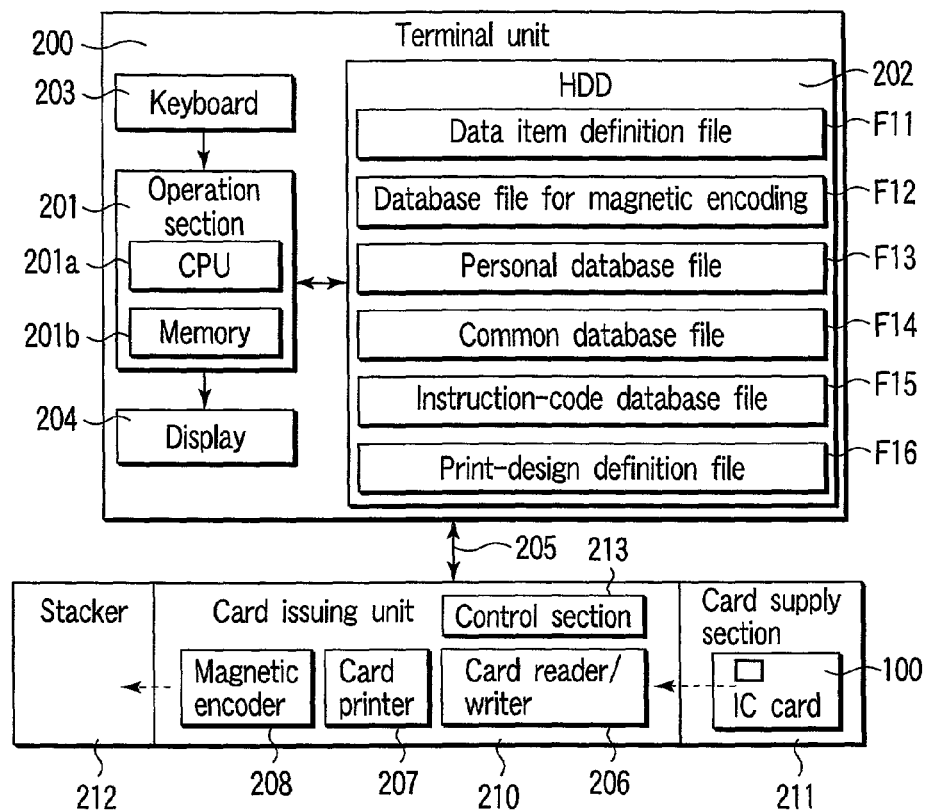
FIG. 1 is a block diagram schematically showing a configuration of an IC-card issuing system of an embodiment of the present invention.

FIG. 1 schematically shows a configuration of an IC card issuing system of an embodiment of the present invention. In FIG. 1, the IC card issuing system has a terminal unit 200 and a card issuing unit 210 and these units 200 and 210 are connected each other by a cable 205. The terminal unit 200 uses, for example, a personal computer (PC) and has a terminal body 201 a hard disk drive (HDD) 202 serving as an auxiliary memory, a keyboard 203 serving as an input unit, and a display 204.

The terminal body 201 includes a CPU (Central Processing Unit) 201a serving as an operation section and a memory 201b serving as a main memory. The CPU 201a controls the key-setting process that is a point of the present invention. Moreover, the terminal body 201 is connected with the hard disk drive 202, keyboard 203, and display 204.

The hard disk drive 202 stores a definition file F11 for defining data items, a database file F12 for magnetic encoding, an personal database file F13, a common database file F14, an instruction-code database file F15, and a definition file F16 for defining printing designs.

The card issuing unit 210 has a card reader/writer 206, a card printer 207, a magnetic encoder 208, a card supply section 211, a stacker 212, and a control section 213 for controlling the whole of the system. The card issuing unit 210 takes in IC cards 100a, ... set to the card supply section 211 one by one and ejects an taken-in IC card 100 (100a, ... ) to the card stacker 212 through the card issuing unit 210.

Figure 2:
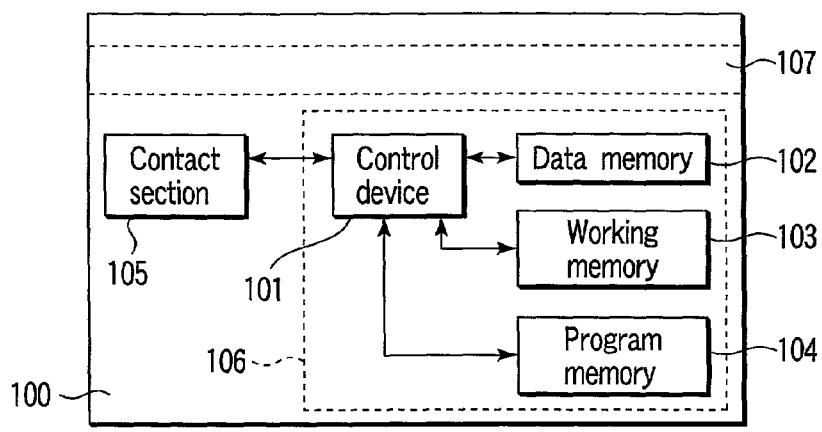
FIG. 2 is a block diagram schematically showing a configuration of an IC card.

As shown in FIG. 2, the IC card 100 (100a, ... ) respectively have a contact section 105, an IC chip 106, and a magnetic strip section 107. The IC chip 106 has a control device 101, a data memory 102, a working memory 103, and a program memory 104. The contact section 105 and IC chip 106 are integrated into a module and embedded in the IC card body.

The control device 101 uses, for example, a CPU. The control device 101 executes key setting, key generation, and key encoding which are points of the present invention. The data memory 102 is a nonvolatile memory whose storage contents are erasable, which uses, for example, an EEPROM (electrically erasable and programmable ROM). The working memory 103 is a memory for temporarily storing the process data of the control device 101, which uses, for example, a RAM (random access memory). The program memory 104 is a memory for storing a program and the like of the control device 101, which uses, for example, a mask ROM (read only memory). The contact section 105 serves as a section electrically contacting with the card reader/writer 206 of the card issuing unit 210 and various data are exchanged between the card issuing unit 210 and IC card 100 through the contact section 105 and the card reader/writer 206.

The card reader/writer 206 of the card-issuing unit 210 exchanges various data with the IC card 100 through the contact section 105 of the IC card 100. Moreover, the card reader/writer 206 magnetically records or reads various data in or from the magnetic stripe section 107 of the IC card 100.

The card-issuing unit 210 has the following functions [1] to [4].

[1] Function of transmitting the instruction data sent from the terminal unit 200 to the card-issuing unit 210 to the control device 101 through the contact section 105 of the IC card 100 (Card reader/writer 206).

[2] Function of transmitting a response sent from the control device 101 of the IC card 100 from the card issuing unit 210 to the terminal unit 200 through the contact section 105 (Card reader/writer 206).

[3] Function of printing the print data sent from the terminal unit 200 to the card-issuing unit 210 on the surface of the IC card 100 (Card printer 207).

[4] Function of magnetically recording the magnetic encoding data sent from the terminal unit 200 to the card issuing unit 210 in the magnetic stripe section 107 of the IC card 100 (Magnetic encoder 208).

FIGS. 3A and 3B show formats of the output information (responses) output from the IC card 100 to instructions (key-setting instruction, key generation instruction, and key takeout instruction) transmitted from the card issuing unit 210 and terminal unit 200. Functions of the key-setting instruction, key-generation instruction, and key-takeout instruction will be described later.

The first format shown in FIG. 3A includes a status code as output information. The status code shows an execution result of the instruction transmitted from the card-issuing unit 210.

The second format shown in FIG. 3B includes a data part and a status code as output information. The status code shows an execution result of the instruction transmitted from the card-issuing unit 210 similarly to the above case. The data part will be described later in detail.

Figures 4A, 4B:
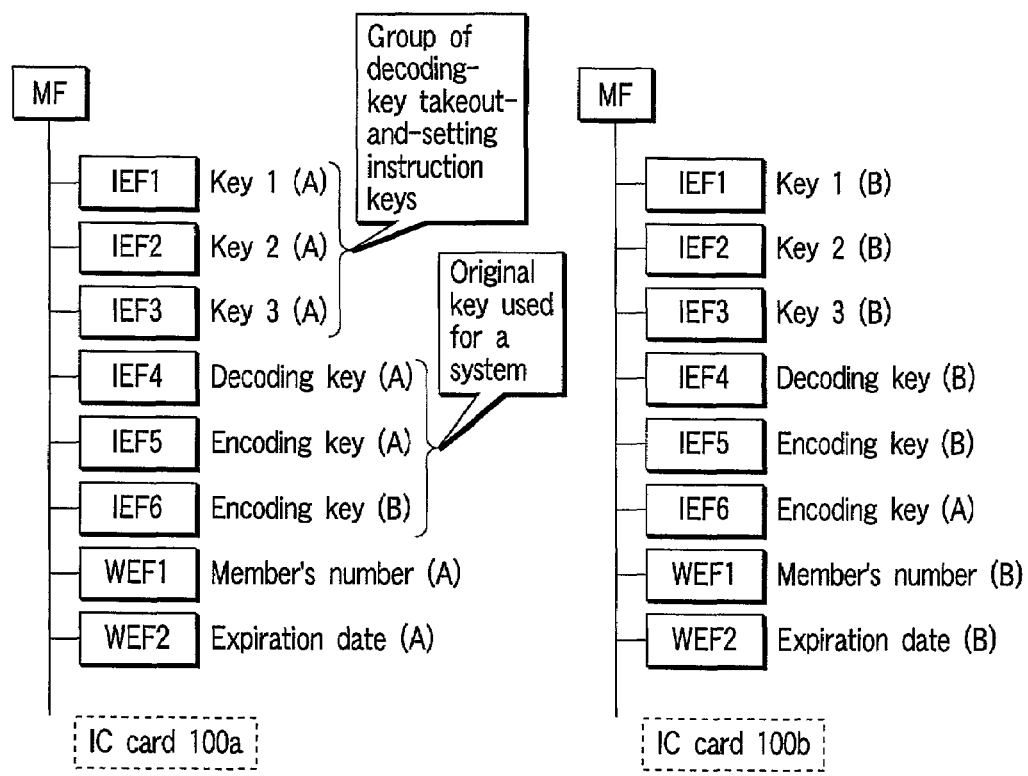
FIGS. 4A and 4B are illustrations showing file structures in a data memory of an IC card.

FIGS. 4A and 4B show file structures in the data memories 102 of the IC cards 100a and 100b.

FIG. 4A shows the file structure in the data memory 102 of the IC card 100a of Mr. A. The file structure is a structure (hierarchical structure) in which a plurality of subfiles (IEF1, IEF2, IEF3, IEF4, IEF5, IEF6, WEF1, and WEF2) hang from a main file (MF) about the main file (MF). The subfiles (IEF1, IEF2, IEF3, IEF4, IEF5, IEF6) function as key storage sections. A key 1(A) is stored in the subfile (IEF1). A key 2(A) is stored in the subfile (IEF2). A key 3(A) is stored in the subfile (IEF3). A decoding key A is stored in the subfile (IEF4). An encoding key A is stored in the subfile (IEF5). An encoding key B is stored in the subfile (IEF6). Collection of these keys 1(A), 2(A), and 3(A) is referred to as a key group (second key). This key group is used as an instruction for taking out and setting the decoding key. The decoding key (A), encoding key (A), and encoding key (B) are assumed as original keys (first keys) used for a system (IC card terminal unit to be described later). Moreover, the member's number (A) of Mr. A is stored in the subfile (WEF1). The expiration date (A) of the card of Mr. A is stored in the subfile (WEF2).

FIG. 4B shows a file structure in the data memory 102 of the IC card 100b (may be shown as IC card b) of Mr. B different from Mr. A. Similarly to the above mentioned, the file structure is a structure in which a plurality of subfiles (IEF1, IEF2, IEF3, IEF4, IEF5, IEF6, WEF1, and WEF2) hang from a main file (MF) about the main file (MF). A key 1(B) is stored in the subfile (IEF1). A key 2(B) is stored in the subfile (IEF2). A key 3(B) is stored in the subfile (IEF3). A decoding key (B) is stored in the subfile (IEF4). An encoding key (B) is stored in the subfile (IEF5). An encoding key (A) is stored in the subfile (IEF6). Collection of these keys 1(B), 2(B), and 3(B) is referred to as key group (second key). The decoding key (B), encoding key (B), and encoding key (A) are assumed as original keys (first keys) used for the system. Moreover, the member's number (B) of Mr. B is stored in the subfile (WEF1). The expiration date (B) of the card of Mr. B is stored in the subfile (WEF2).

Concealment and validity of data are confirmed in the IC chip 106 of the IC card 100 by using the original keys. These keys are encoded by using the key group. These original keys are also generated in the IC chip 106 in order to improve the security. The key group encodes original keys, which is set in accordance with a key-setting instruction generated by the card-issuing unit 210, a key-setting instruction generated by a personal terminal unit to be described later, or a special key-setting instruction when a card is issued. To execute correct encoding, it is necessary to set a correct key group.

Figure 5:
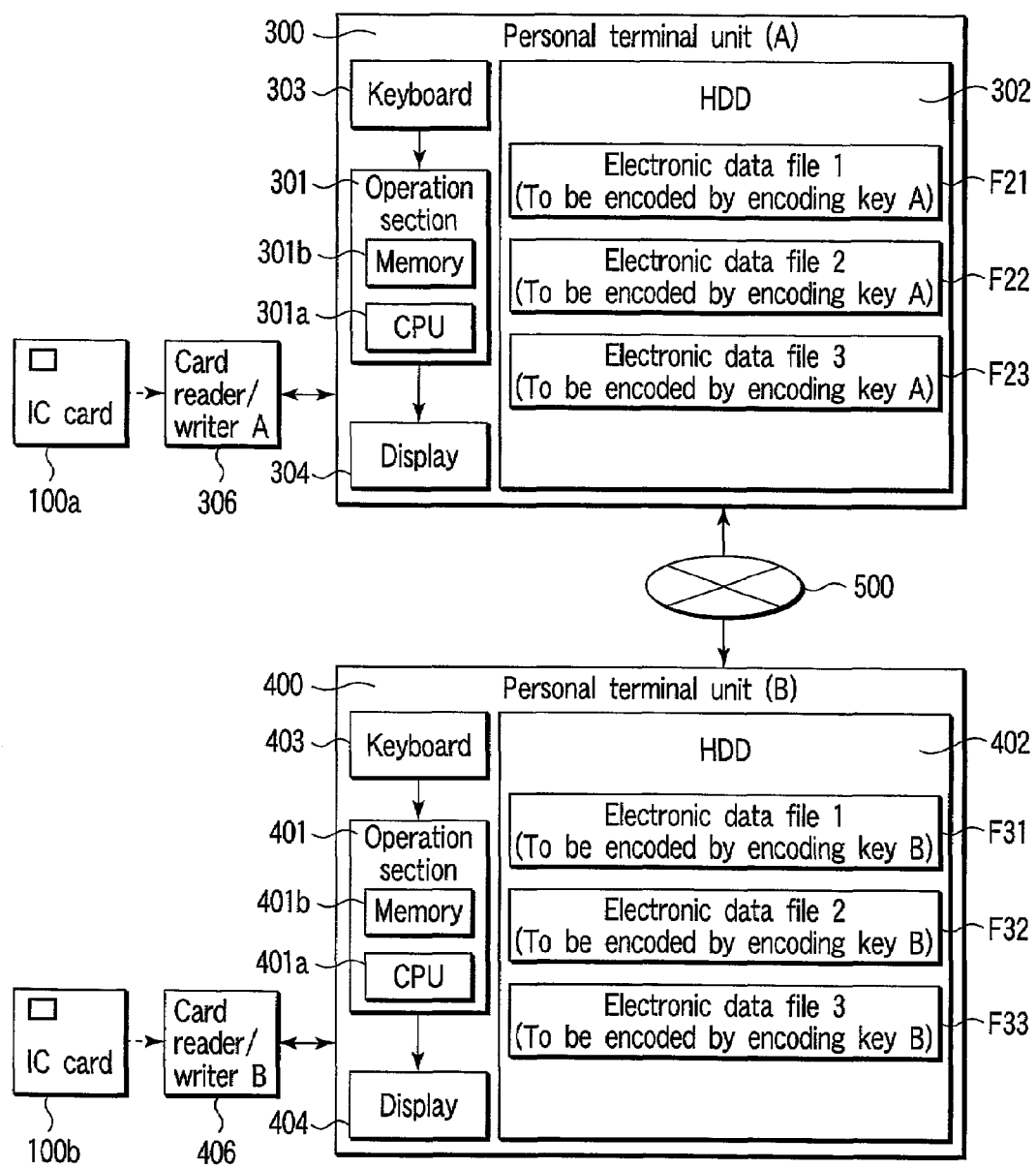
FIG. 5 is a block diagram showing a system for using a key of an IC card.

FIG. 5 shows a system for using a key in the IC card 100 (100a or 100b).

In FIG. 5, a personal terminal unit 300 (may be shown as a personal terminal unit (A)) serving as an IC card terminal unit is owned by Mr. A. A personal terminal unit 400 (may be shown as a personal terminal unit (B)) is owned by Mr. B. These personal terminal units 300 and 400 are connected each other through a communication line 500 such as a network or LAN. Various data and various electronic data files are exchanged between the both terminal units 300 and 400.

The personal terminal unit 300 uses, for example, a personal computer (PC). The personal terminal unit 300 has a terminal body 301, a hard disk drive (HDD) 302 serving as an auxiliary memory, a keyboard 303 serving as an input unit, and a display 304.

The terminal body 301 has a CPU 301a serving as an operation section and a memory 301b serving as a main memory. The CPU 301a controls key setting that is a point of the present invention. Moreover, the terminal body 301 connects with the hard disk drive 302, keyboard 303, display 304, and card reader/writer 306 (may be shown as a card reader/writer A). The hard disk drive 302 stores electronic data files F21, F22, and F23 which are secret information encoded by the encoding key A. An electronic data file is an electronic mail, a document file, or a program source.

The personal terminal unit 300 exchanges various data with the IC card 100a through the card reader/writer 306.

The personal terminal unit 400 is constituted the same as the unit 300 is. That is, the personal terminal unit 400 uses, for example, a personal computer (PC). The personal terminal unit 400 has a terminal body 401, a hard disk drive (HDD) 402 serving as an auxiliary memory, a keyboard 403 serving as an input unit, and a display 404.

The terminal body 401 has a CPU 401a serving as an operation section and a memory 401b serving as a main memory. The CPU 401a controls key setting that is a point of the present invention. Moreover, the terminal body 401 connects with the head disk drive 402, keyboard 403, display 404, and card reader/writer 406 (may be shown as a card reader/writer B). The hard disk drive 402 stores electronic data files F31, F32, and F33 which are the secret information encoded by the encoding key B.

The personal terminal unit 400 exchanges various data with the IC card 100b through the card reader/writer 406.

The personal terminal units 300 and 400 exchange various data and various electronic data files each other through the communication line 500 such as a network or LAN. In this case, to send an electronic data file from the personal terminal unit 400 to the personal terminal unit 300, the personal terminal unit 400 transmits an encoding instruction to the IC card 100b through the card reader/writer 406 by an encoding key (A) to which an electronic data file 1 (electronic data file F31) is added.

The encoding instruction according to the encoding key (A) received by the contact section 105 of the IC card 100b is decoded by the control device 101. In the case of this decoding, the encoding instruction according to the encoding key (A) is clarified. The electronic data file 1 added to the encoding instruction is decoded by the decoding key B in accordance with the above decoding result. Thereafter, encoding is performed by the encoding key A. Then, normal-end information and an encoded result are transmitted from the contact section 105 to the personal terminal unit 400 through the card reader/writer 406 as a response to the encoding instruction.

The personal terminal unit 400 transmits the response information (electronic data file 1 encoded by the encoding key A) sent from the IC card 100b to the personal terminal unit 300. The personal terminal unit 300 stores the received information (electronic data file 1 encoded by the encoding key A) in the electronic data file F21 of the hard disk drive 302. To read the received information (electronic data file 1 encoded by the encoding key A), the terminal unit 300 first transmits a decoded instruction by the decoding key (A) to which the electronic data file 1 (electronic data file F21) encoded by the encoding key A to the IC card 100a through the card reader/writer 306.

The decoded instruction by the decoding key (A) received by the contact section 105 of the IC card 100a is decoded by the control device 101. In this case, the decoded instruction by the decoding key (A) is clarified. The electronic data file 1 added to the decoded instruction is decoded by the decoding key (A) in accordance with the above decoding result. Normal-end information and a decoding result are transmitted from the contact section 105 to the personal terminal unit 300 through the card reader/writer 306 as a response to the decoded instruction.

Thus, because decoding is performed only in the IC card 100 by using a decoding key in the IC card 100, security is improved. However, when a decoding key is lost because the IC card 100 is broken, it is impossible to decode an electronic data file stored in the hard disk drive 302 of the personal terminal unit 300. Moreover, it is impossible to decode the data sent from the personal terminal unit 400.

Therefore, in the case of the present invention, an original card (normal IC card) TC and a backup card (duplicate card of the normal IC card) BC are generated for the IC card 100 by the card issuing unit 210 in accordance with generation of a backup card (may be shown as back-up IC card) BC to be described later in detail. The personal terminal unit 300 or 400 generates an encoding key and a decoding key in the original card TC and immediately generates the backup card BC. Then, by using the backup card BC when the original card TC is broken and thereby, decoding an electronic data file and encoding the file by a new IC card, it is possible to prevent the electronic data file from being impossible in decoding.

First, a method for generating instruction data by the terminal unit 200 of an IC card issuing system is described below by referring to FIGS. 6 to 10.

As shown in FIG. 6, the personal database file F13 stored in the hard disk drive 202 of the terminal unit 200 is constituted of a record group (discrete data group) using discrete data such as kanji name (Item 1), kanji address (Item 2), kana character (Item 3), member's number (Item 4), expiration date (Item 5), password (Item 6), and key 1 (Item 7) as one record.

Moreover, the database file F15 of instruction codes for an original card stored in the hard disk drive 202 is constituted of instruction codes for setting conditions to the control device 101 in the IC chip 106 of the IC card 100 or writing additional data in the data memory 102. For example, as shown in FIG. 7, an instruction code space, an instruction code content space, an additional data space, and an IC output information space are prepared. In the case of the example in FIG. 7, "the content of instruction code 18" is defined for an instruction code 18, "Item 6 for personal database file" is defined as additional data, IC output information is defined to be compared with "9000", "Item 5 for personal database file" is defined for additional data of "instruction code 25", and IC output information is defined to be compared with "9000".

Figures 9, 10:
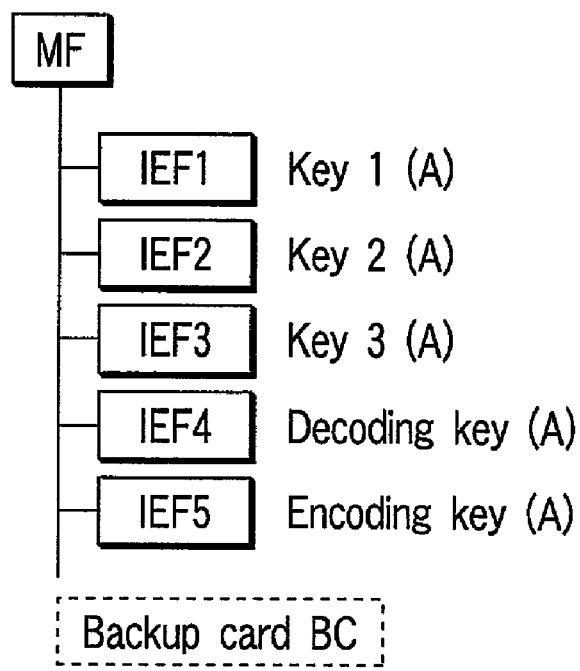
FIG. 9 is an illustration showing a file structure in a data memory of an IC card for backup card.
FIG. 10 is an illustration showing instruction data.

As shown in FIG. 10, the terminal unit 200 generates the instruction data in which data "4983 . . . 6c4478" in Item 7 for the personal database file (record #14) is added to the content (key-setting instruction) of an instruction code 19 as additional data in accordance with the instruction-code database shown in FIG. 7 and the personal database shown in FIG. 6.

For example, the key 1 of the key group shown in FIG. 4A is set as described below. The operation section 201a of the terminal unit 200 generates an instruction code in accordance with the instruction code 19 in the instruction-code database file stored in the hard disk drive 202 (refer to FIG. 7) and Item 7 for the personal database file (refer to FIG. 6). Then, the operation section 201a sends the generated instruction data to the IC chip 106 of the IC card 100 through the card reader/writer 206. Thereby, the key 1 is set to the IC chip 106 of the IC card 100. The instruction code 19 is referred to as a key-setting instruction.

Operations in the IC chip 106 of the IC card 100 are more minutely described below.

A key-setting instruction to which the key 1 is added is transmitted from the card reader/writer 206 to the contact section 105 of the IC card 100. The key-setting instruction received by the contact section 105 is decoded by the control device 101. According to the above decoding, the control device 101 determines an instruction for setting the key 1. In accordance with the above determination, the control device 101 sets (stores) the key 1 in the subfile (IEF1) in the data memory 102. After storing the key 1, the control device 101 transmits normal-end information to the operation section 201a through the contact section 105 and card reader/writer 206 as a response to the key-setting instruction. That is, the normal-end information is communicated to the terminal body 201.

The database file of instruction codes for a backup card is constituted of instruction codes for setting conditions to the control device 101 in the IC chip 106 of the IC card 100 and writing additional data in the data memory 102 similarly to the case of the database file of instruction codes for an original card. For example, as shown in FIG. 8, an instruction code space, an instruction code content space, an additional data space, and an IC output information space are prepared. In the case of the example in FIG. 8, "Item 6 for personal database file" is defined for the additional data of "instruction code 18".

As shown in FIG. 9, the backup card BC has a file structure excluding the information for a member's number and an expiration date which are the indispensable information for executing functions of the original card TC. Therefore, in the case of a database file of instruction codes for a backup card, instruction codes from the key-1 setting information downward are not defined differently from the case of a database file of instruction codes for an original card.

Figure 11A:
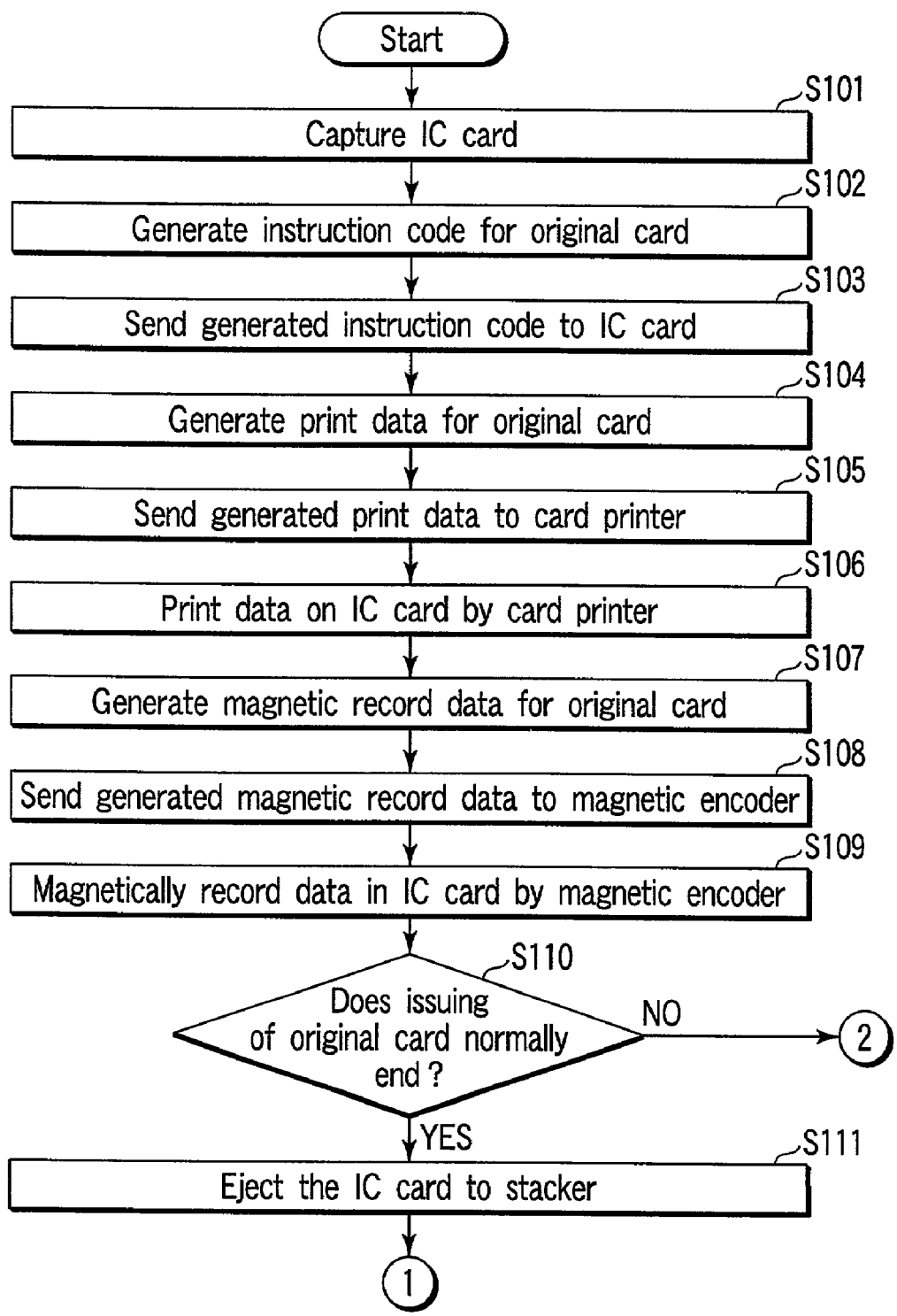
FIGS. 11A and 11B are flowcharts for explaining issuing processes of an original card and a backup card.
Figure 11B:
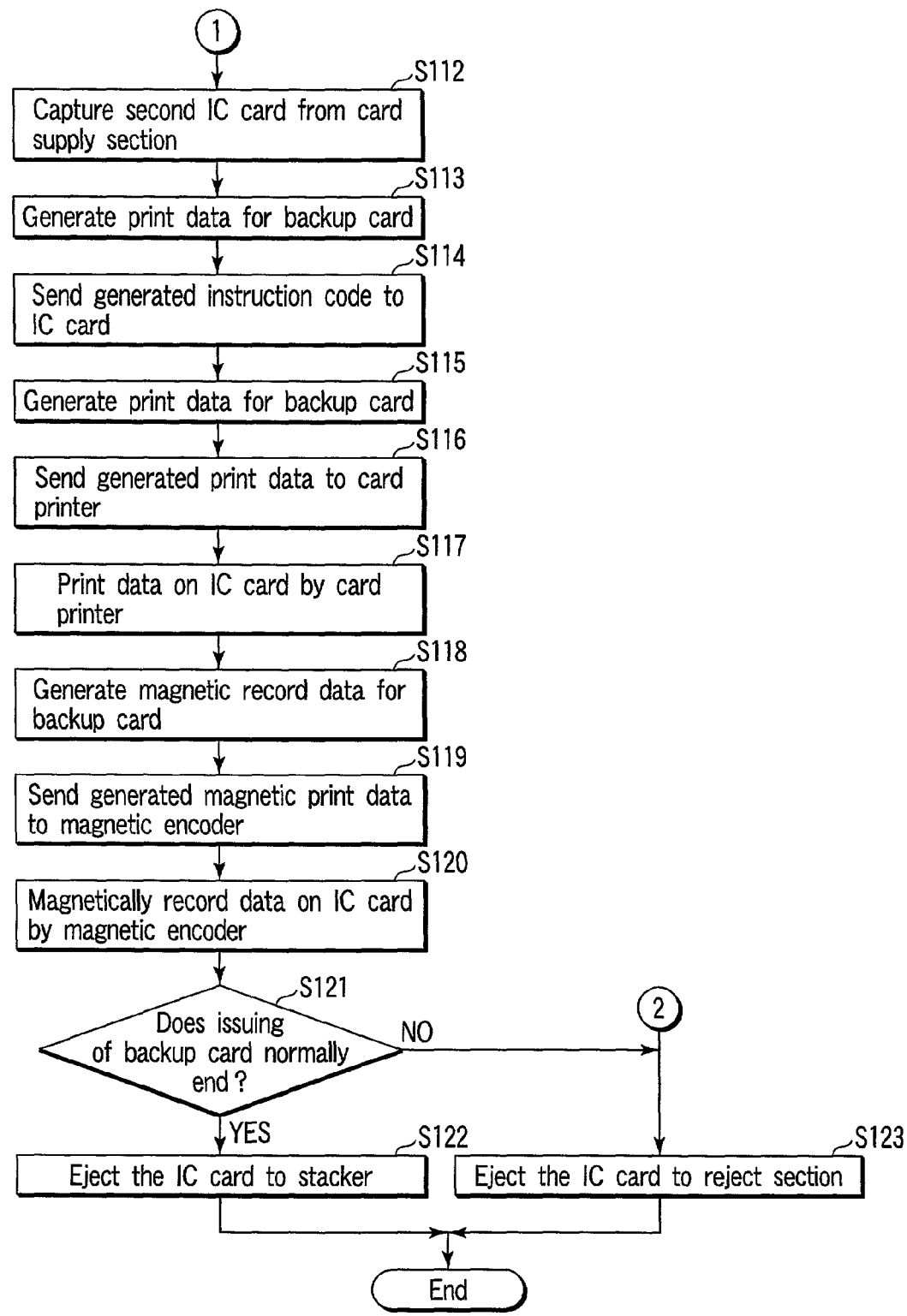

Then, issuing of the original card TC and backup card BC is described below by referring to the flowcharts shown in FIGS. 11A and 11B.

First, the control section 213 captures the IC card 100 from the card supply section 211 (S101). Thereafter, the operation section 201a generates an instruction code in accordance with the database file F15 of instruction codes for an original card (S102). Then, the operation section 201a sends the generated instruction code to the IC card 100 (S103).

Then, the operation section 201a generates print data on the card surface in accordance with the definition file F16 of a print design for an original card (S104). Then, the operation section 201a sends the generated print data to the card printer 207 (S105). Thereby, the card printer 207 prints data on the surface of the IC card 100 (S106).

Then, the operation section 201a generates magnetic recording data in accordance with the database file F12 for magnetically encoding an original card (S107). Then, the operation section 201a sends the generated magnetic-recording data to the magnetic encoder 208 (S108). Thereby, the magnetic encoder 208 magnetically records data in the magnetic stripe section 107 of the IC card 100 (S109).

Then, the control section 213 confirms whether issuing of the original card TC normally ends (S110). When issuing of the original card TC is normally ends, the control section 213 ejects the IC card 100 to the stacker 212 (S111). The IC card 100 ejected to the stacker 212 is an IC card issued as the original card TC.

Then, after ejecting the original card TC to the stacker 212, the control section 213 captures the second IC card 100 from the card supply section 211 (S112). Thereafter, the operation section 201a generates an instruction code in accordance with the database file F15 of instruction codes for an original card (S113). Then, the operation section 201a sends the generated instruction code to the IC card 100 (S114).

Then, the operation section 201a generates print data on the card surface in accordance with the definition file F16 of a print design for a backup card (S115). Then, the operation section 201a sends the generated print data to the card printer 207 (S116). Thereby, the card printer 207 prints data on the surface of the IC card 100 (S117).

Then, the operation section 201a generates magnetic recording data in accordance with the database file F12 for magnetically encoding a backup card (S107). Then, the operation section 201a sends the generated magnetic-recording data to the magnetic encoder 208 (S119). Thereby, the magnetic encoder 208 magnetically records data in the magnetic stripe section 107 of the IC card 100 (S120).

Then, the control section 213 confirms whether issuing of the backup card BC normally ends (S121). When issuing of the backup card BC normally ends, the control section 213 ejects the IC card 100 to the stacker 212 (S122). The IC card 100 ejected to the stacker 212 is an IC card issued as the backup card BC. When issuing of a card normally ends in steps S110 and S121, the control section 213 ejects the IC card 100 to a not-illustrated reject section (S123).

Figure 12:
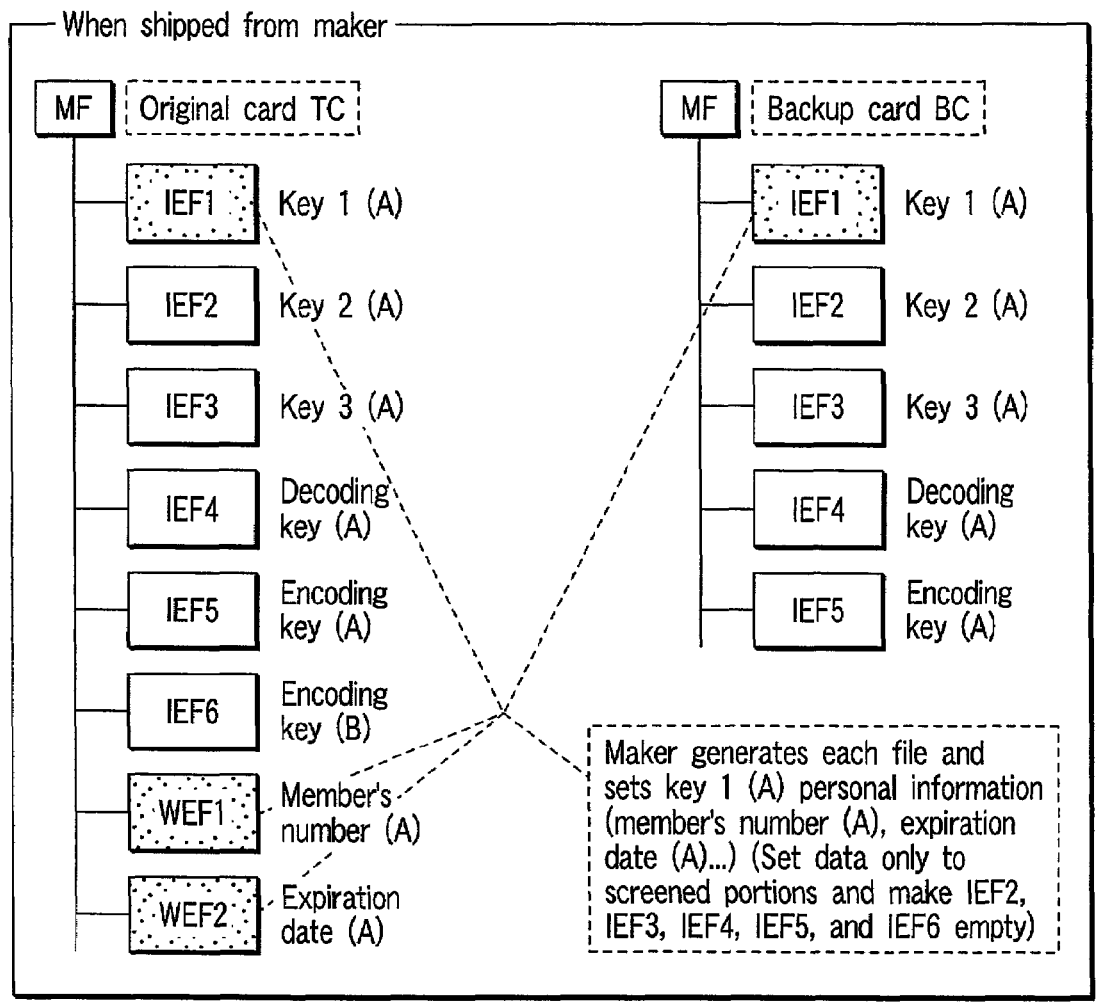
FIG. 12 is an illustration schematically showing internal states of data memories in an original card and a backup card shipped from a card maker.

Thus, the original card TC and backup card BC are issued. FIG. 12 schematically shows internal states of the data memories 102 in the original card TC and backup card BC immediately after the both cards are issued (when shipped from a card maker). As a result of the above issuing, predetermined data is set (stored) in the screened files (IEF1, WEF1, and WEF2) in FIG. 12 but no data is set to other files (IEF2, IEF3, IEF4, IEF5, and IEF6) not screened.

Then, the processing for generating an encoding key and a decoding key in the original card TC issued as described above and setting the decoding key to the backup card BC is described below. Though the following explanation is described about a case of performing the above processing by the personal terminal unit 300, the processing can be performed also by using the personal terminal unit 400.

Figures 13, 14:
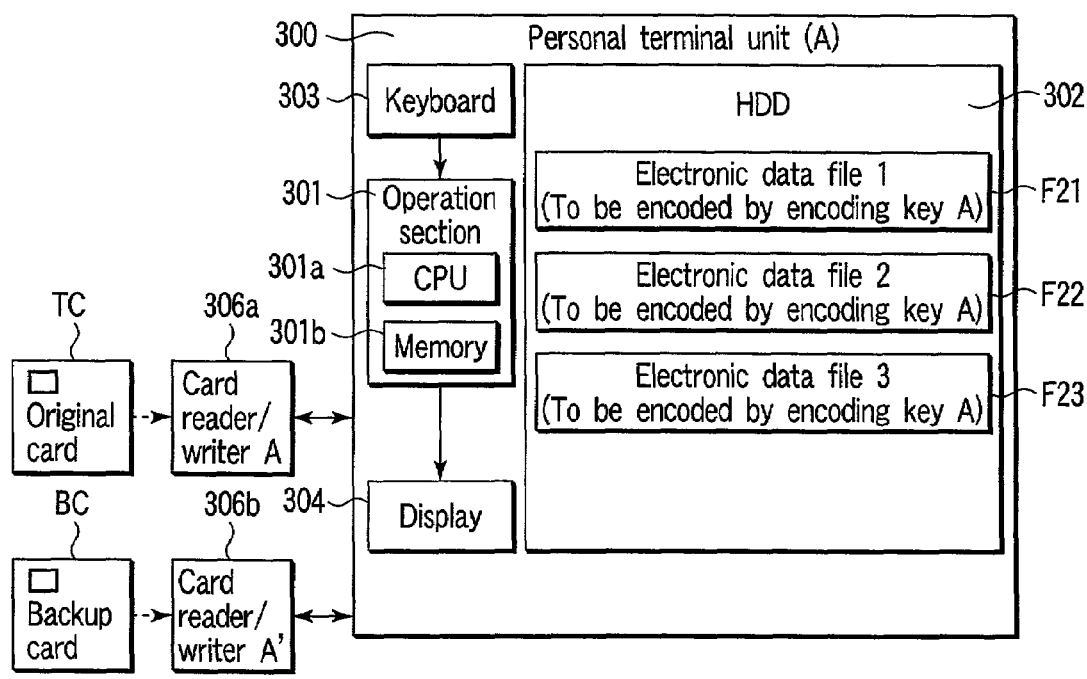
FIG. 13 is a block diagram showing a configuration of a system for generating an encoding key and a decoding key in an issued original card and setting a decoding key to a backup card.
FIG. 14 is an illustration showing a key input screen.
Figure 15A:
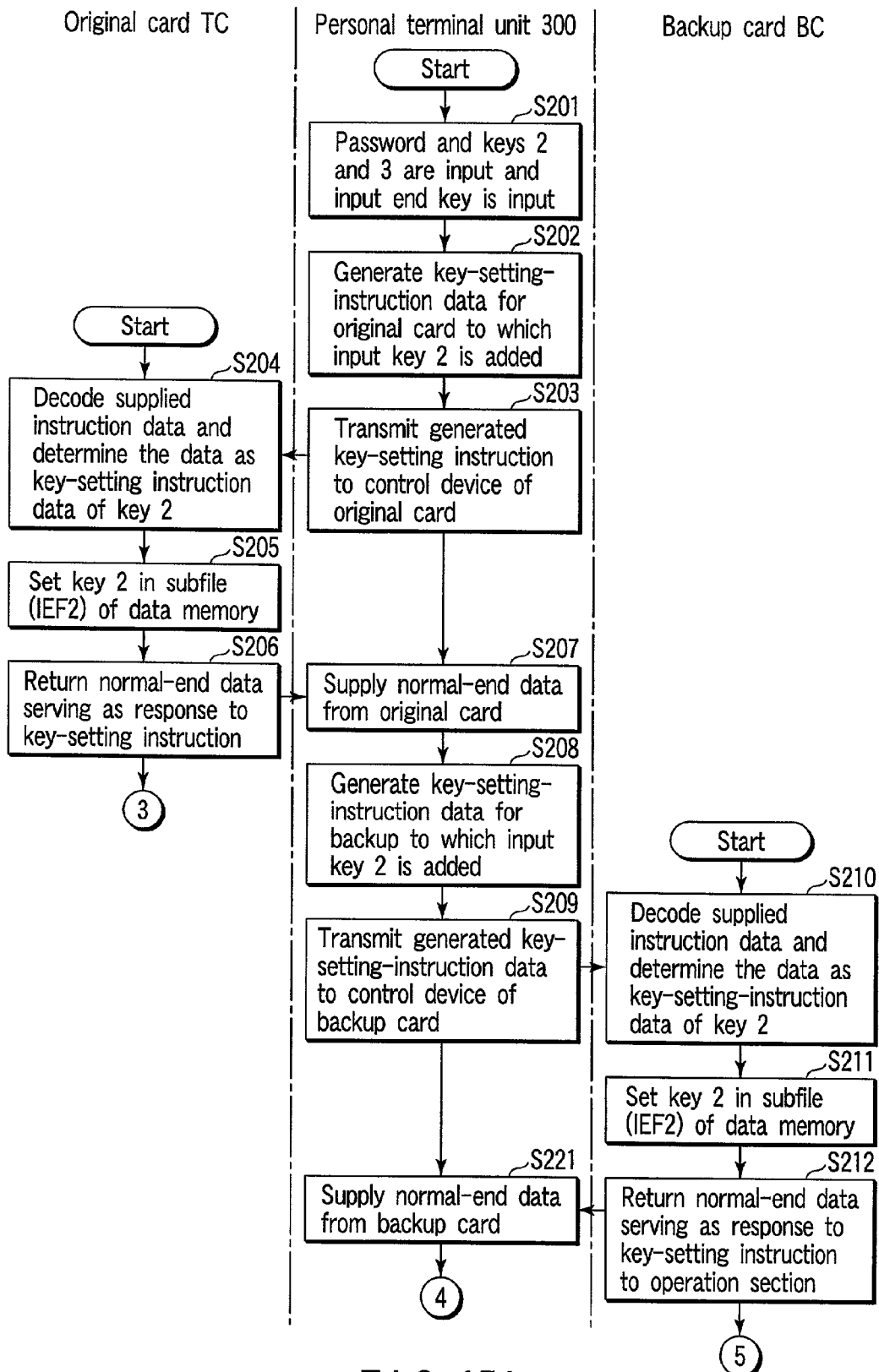
FIGS. 15A to 15D are flowcharts showing processes for setting keys to an original card and a backup card, generating an encoding key and a decoding key in the original card, taking out the decoding key from the original card, and setting the decoding key to the backup card.
Figure 15B:
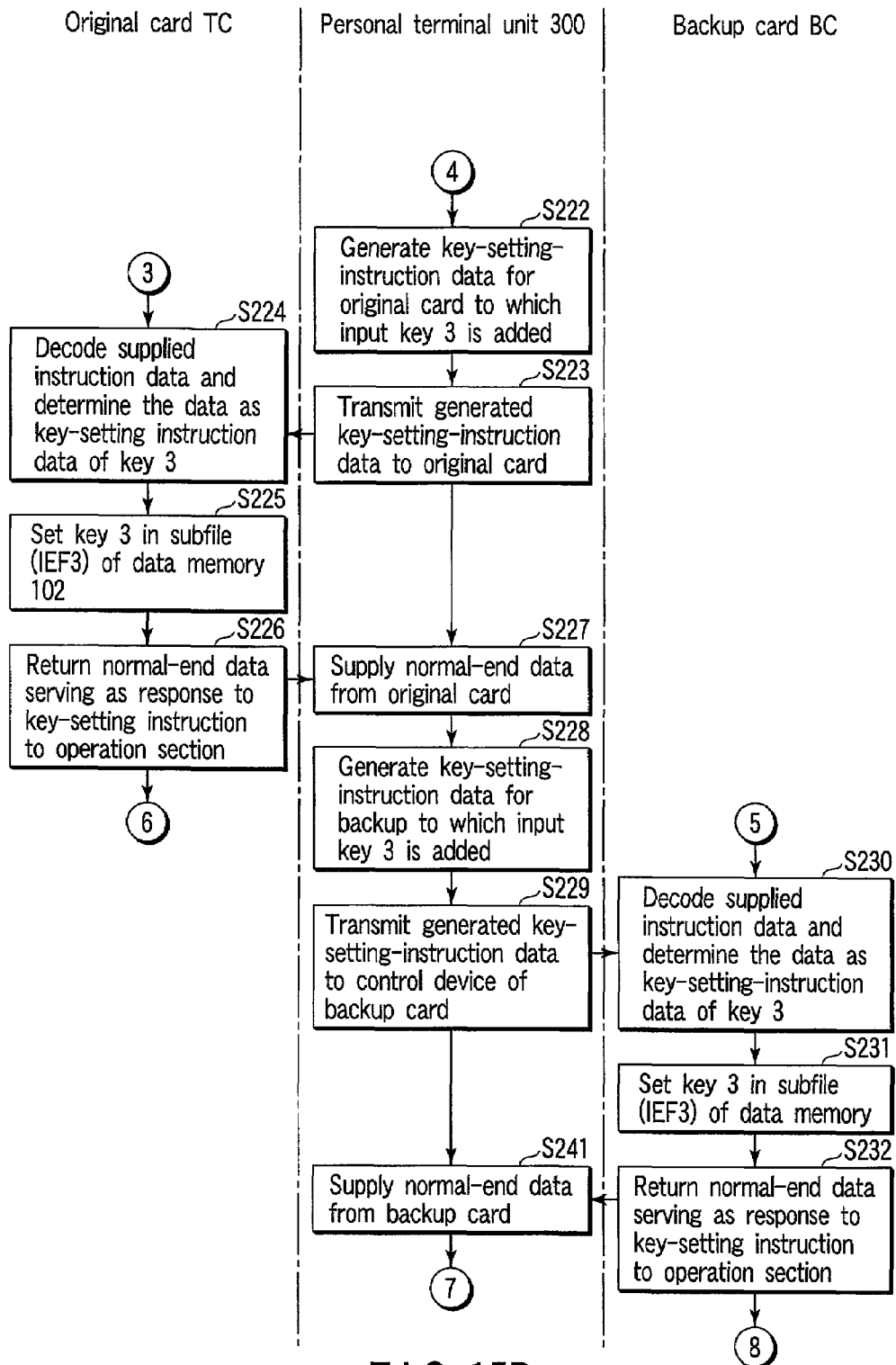
Figure 15C:
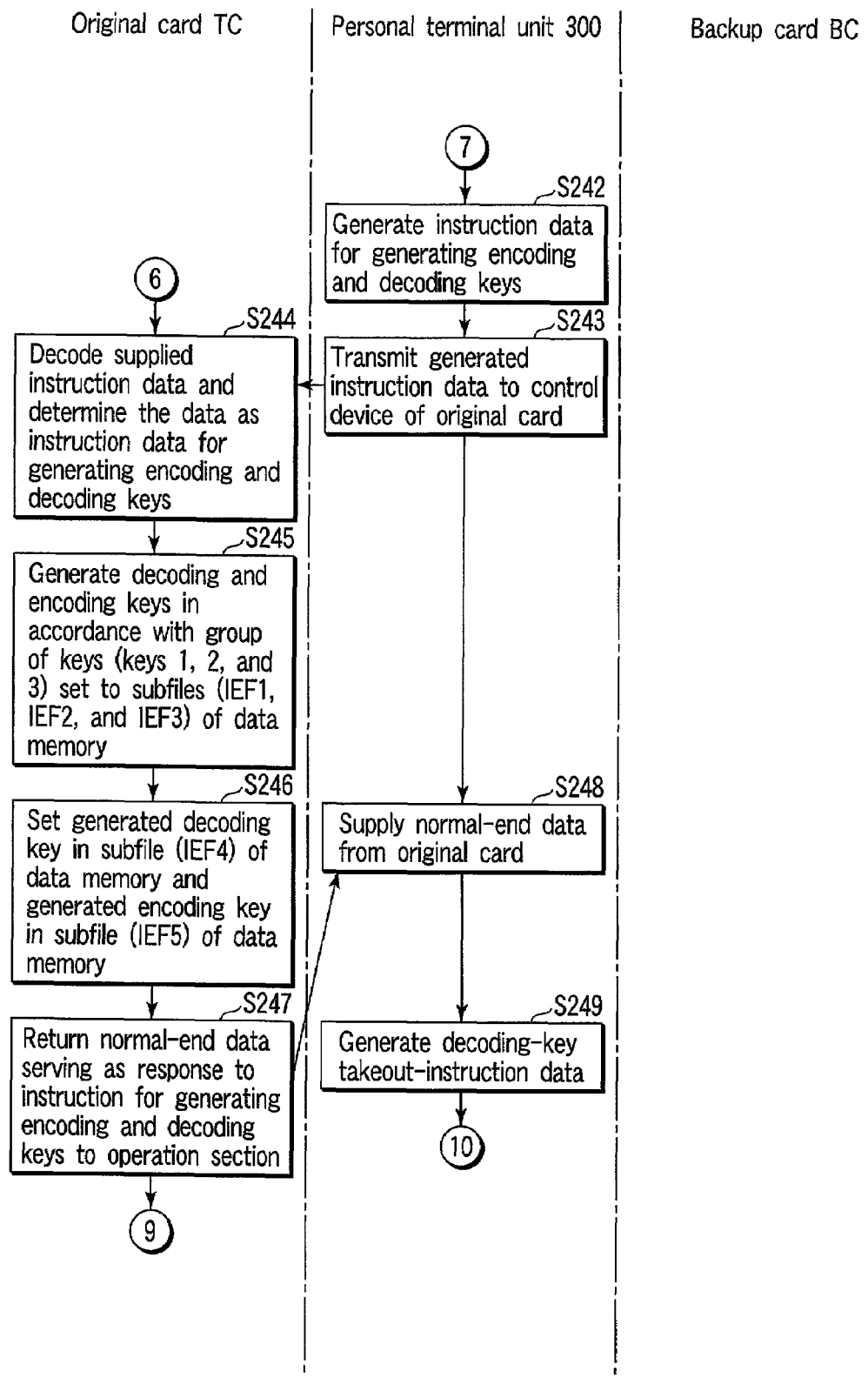
Figure 15D:
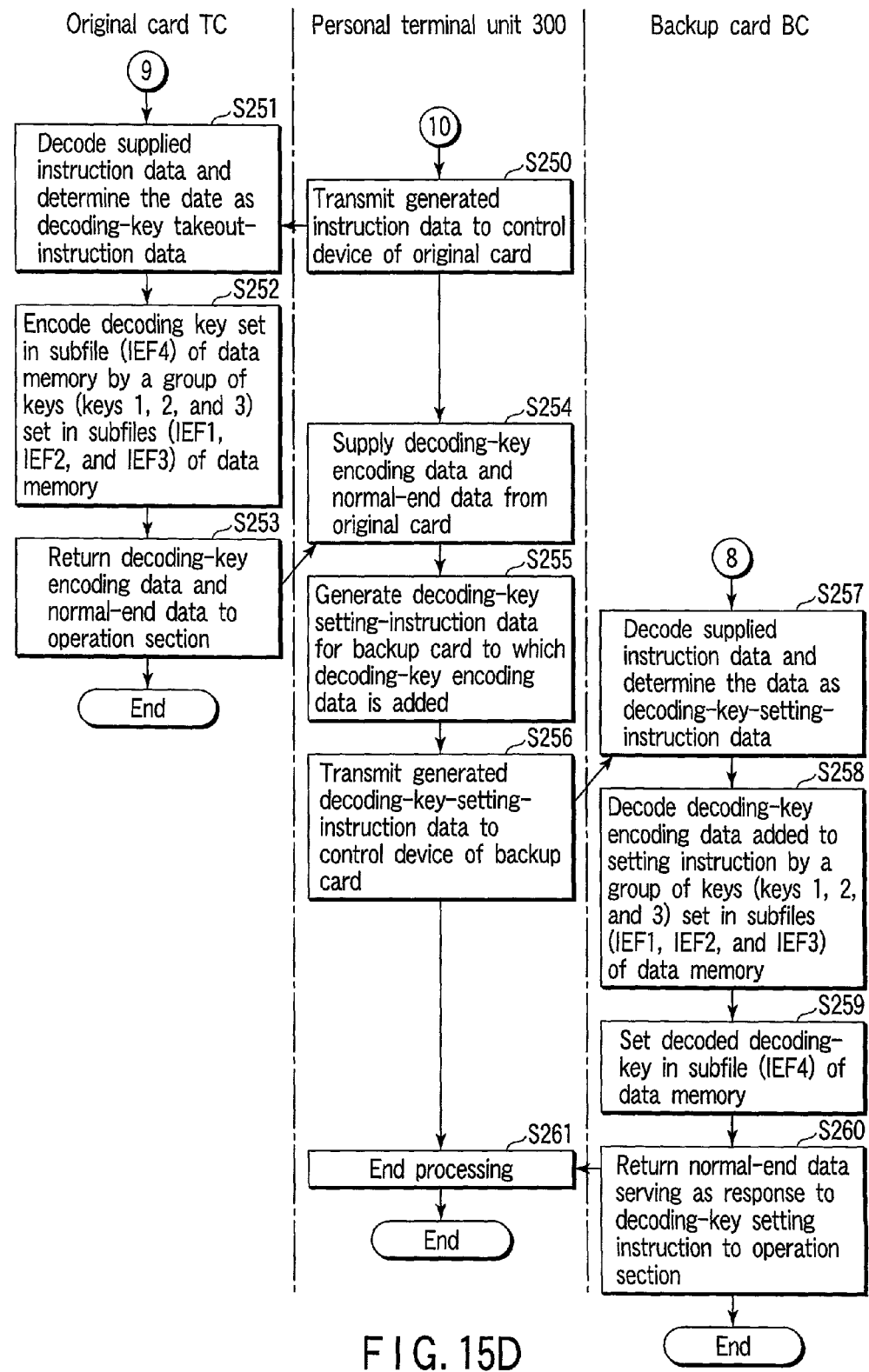

First, a configuration of a system for generating an encoding key and a decoding key in the original card TC and setting the decoding key to the backup card BC is described below by referring to FIG. 13. In FIG. 13, the card reader/writer 306a for an original card and the card reader/writer 306b for a backup card are connected to the personal terminal unit 300, the original card TC issued as described above is inserted into the card reader/writer 306a, and the backup card issued as described above is inserted into the card reader/writer 306b.

The key input screen shown in FIG. 14 is displayed on the display 304 of the personal terminal unit 300. The key input screen displays an area for inputting a key not set through the above issuing among a group of setting-instruction keys, an area for inputting a collation password necessary for key setting, an input end button for indicating end of key input, and an end button for interrupting processing.

A group of keys (key 2 and key 3) to be set is input to the terminal body 301 by operations of the keyboard 303 by an operator. When input of all keys (key 2 and key 3) and a password is completed and input end is indicated by the input end button, it is started to set keys to the original card TC and backup card BC, generate an encoding key and a decoding key for the original card TC, take out the decoding key from the original card TC, and set the decoding key to the backup card BC.

Then, setting of keys to the original card TC and backup card BC, generation of encoding and decoding keys in the original card TC, taking-out of the decoding key from the original card TC, and setting of the decoding key to the backup card BC are described below by referring to the flowcharts shown in FIGS. 15A, 15B, 15C, and 15D.

First, a password, the keys 2 and 3, and the input end key are input through operations of the keyboard 303 by an operator (S201). Through the above input of them, the operation section 301a generates the key-setting instruction data for an original card to which the above input key 2 is added (S202). Then, the operation section 301a transmits the generated key-setting-instruction data to the control device 101 of the original card TC (IC card 100c) through the card reader/writer 306a (S203).

Then, the control device 101 of the original card TC decodes the supplied instruction data and when determining that the data is the key-setting instruction data for the key 2 (S204), sets (stores) the key 2 in the subfile (IEF2) of the data memory 102 (S205). After setting the key 2, the control device 101 returns normal-end data serving as a response to the key-setting instruction to the operation section 301a through the card reader/writer 306a (S206). That is, the normal-end data is communicated to the terminal body 301.

Then, when the normal-end data is supplied from the original card TC (S207), the operation section 301a generates key-setting-instruction data for backup to which the above input key 2 is added (S208). Then, the operation section 301a transmits the generated key-setting-instruction data to the control device 101 of the backup card BC (IC card 100d) through the card reader/writer 306b (S209).

Then, the control device 101 of the backup card BC decodes the supplied instruction data and when determining that the data is the key-setting-instruction data for the key 2 (S210), sets (stores) the key 2 in the subfile (IEF2) of the data memory 102 (S211). After setting the key 2, the control device 101 returns the normal-end data serving as a response to the key-setting instruction to the operation section 301a through the card reader/writer 306b (S212). That is, the normal-end data is communicated to the terminal body 301.

Then, when the normal-end data is supplied from the backup card BC (S221), the operation section 301a generates the key-setting-instruction data for an original card to which the above input key 3 is added (S222). Then, the operation section 301a transmits the generated key-setting-instruction data to the control device 101 of the original card TC (IC card 100c) through the card reader/writer 306a.

Then, the control device 101 of the original card TC decodes the supplied instruction data and when determining that the data is the key-setting-instruction data for the key 3 (S224), sets (stores) the key 3 in the subfile (IEF3) of the data memory 102 (S225). After setting the key 3, the control device 101 returns the normal-end data serving as a response to the key-setting instruction to the operation section 301a through the card reader/writer 306a (S226). That is, the normal-end data is communicated to the terminal body 301.

Then, when the normal-end data is supplied from the original card TC (S227), the operation section 301a generates the key-setting instruction for backup to which the above input key 3 is added (S228). Then, the operation section 301a transmits the generated key-setting-instruction data to the control device 101 of the backup card (IC card 100d) through the card reader/writer 306b (S229).

Then, the control device 101 of the backup card BC decodes the supplied instruction data and when determining that the data is the key-setting-instruction data for the key 3 (S230), it sets (stores) the key 3 in the subfile (IEF3) of the data memory 102 (S231).

After setting the key 3, the control device 101 returns the normal-end data serving as a response to the key-setting instruction to the operation section 301a through the card reader/writer 306b (S232). That is, the normal-end data is communicated to the terminal body 301.

Then, when the normal-end data is supplied from the backup card BC, the operation section 301a (S241), the operation section 301a generates the instruction data for generating an encoding key and a decoding key (S242). Then, the operation section 301a transmits the generated data to the control device 101 of the original card TC (IC card 100c) through the card reader/writer 306a (S243).

Then, the control device 101 of the original card TC decodes the supplied instruction data and when determining that the data is the instruction data for generating an encoding key and a decoding key (S244), it generates a decoding key and an encoding key by the group of keys (key 1, key 2, and key 3) set to the subfiles (IEF1, IEF2, and IEF3) of the data memory 102 (S245). Then, the control device 101 sets (stores) the generated decoding key in he subfile (IEF4) of the data memory 102 (S246). After setting the key, the control device 101 returns the normal-end data serving as a response to the instruction for generating an encoding key and a decoding key to the operation section 301a through the card reader/writer 306a (S247). That is, the normal-end data is communicated to the terminal body 301.

Then, when the normal-end data is supplied from the original card TC (S248), the operation section 301a generates decoding-key-takeout-instruction data (S249). Then, the operation section 301a transmits the generated instruction data to the control device 101 of the original card TC (IC card 100c) through the card reader/writer 306a (S250).

Then, the control device 101 of the original card TC decodes the supplied instruction data and when determining that the data is the decoding-key-takeout-instruction data (S251), it encodes the decoding key set in the subfile (IEF4) of the data memory 102 by the group of keys (key 1, key 2, and key 3) set in the subfiles (IEF1, IEF2, and IEF3) of the data memory 102. Then, the control device 101 returns the decoding-key-encoding data and normal-end data to the operation section 301a through the card reader/writer 306a (S253).

Then, when the decoding-key encoding data and normal-end data are supplied from the original card TC (S254), the operation section 301a generates decoding-key setting-instruction data for a backup card to which the above decoding-key encoding data is added (S255). Then, the operation section 301a transmits the generated decoding-key-setting-instruction data to the control device 101 of the backup card BC (IC card 100d) through the card reader/writer 306b (S256).

Then, the control device 101 of the backup card BC decodes the supplied instruction data and when determining the data is the decoding-key-setting-instruction data (S257), it decodes the decoding-key-encoding data added to a setting instruction by the group of keys (key 1, key 2, and key 3) set in the subfiles (IEF1, IEF2, and IEF3) of the data memory 102 (S258). The control device 101 sets (stores) the decoded decoding key in he subfile (IEF4) of the data memory 102 (S259).

After setting the key, the control device 101 returns the normal-end data serving as a response to the decoding-key-setting instruction to the operation section 301a through the card reader/writer 306b. That is, the normal-end data is communicated to the terminal body 301.

The operation section 301a completes the processing when the normal-end data for the above decoding-key setting instruction is supplied from the backup card BC (S261).

Figure 16:
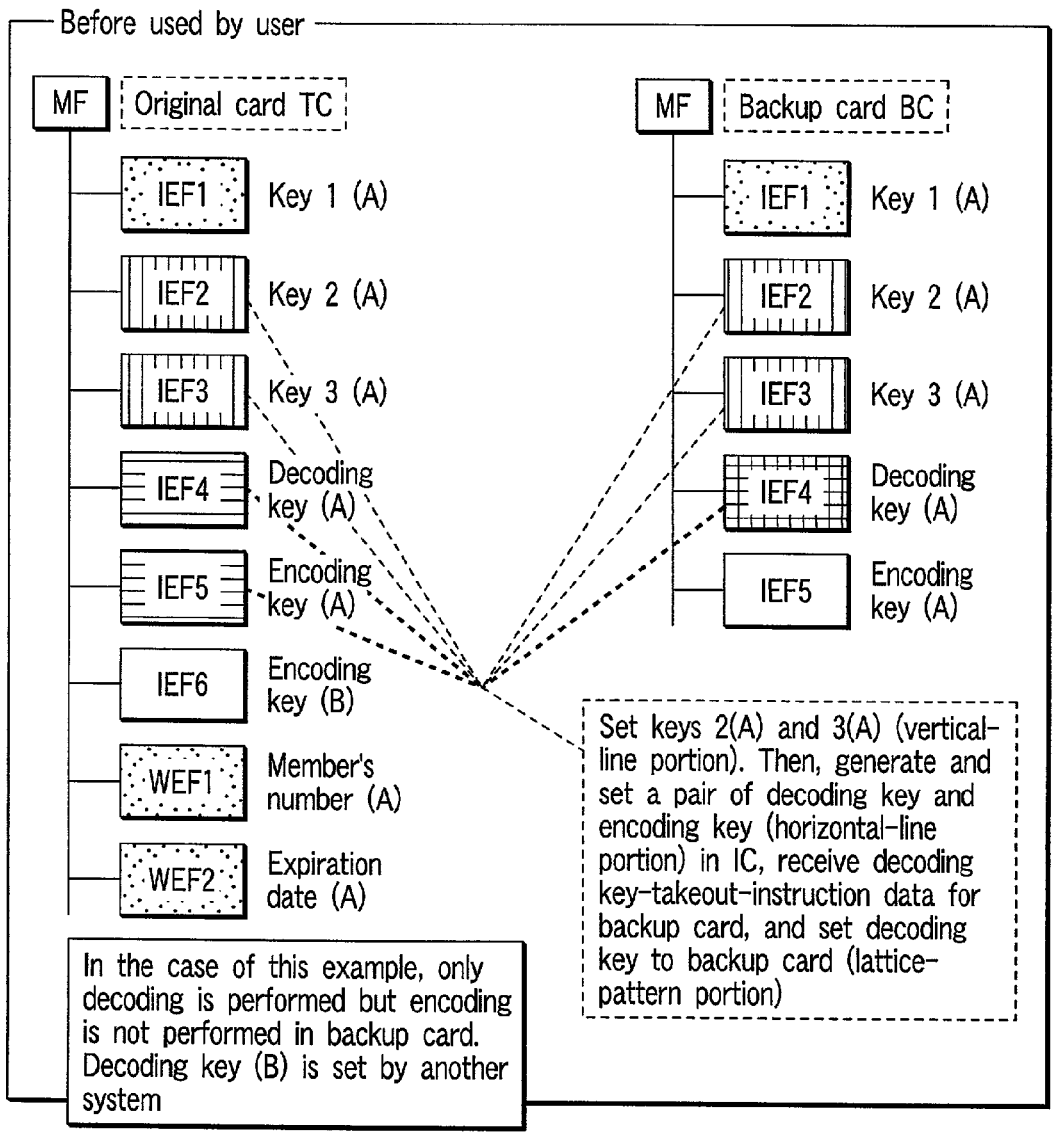
FIG. 16 is an illustration schematically showing internal states of data memories in an original card and a backup card before used by a user.

Thus, an encoding key and a decoding key are generated in the original card TC to set the decoding key to the backup card BC. FIG. 16 schematically shows internal states of the data memories 102 in the both cards immediately after the processing ends (before a user starts using the cards).

According to the above processing, predetermined data is set (stored) in the IEF2, IEF3, IEF4, and IEF5 of the original card TC and the IEF2, IEF3, and IEF4 of the backup card BC but no data is set in the IEF6 of the original card TC or the IEF5 of the backup card BC. In the case of this example, the backup card BC performs only decoding but it does not perform encoding. Moreover, the encoding key (B) of the IEF6 of the original card TC is set by another system.

That is, the keys 2(A) and 3(A) are set (vertical-line portion). Then, an encoding key and a decoding key are generated and set, decoding-key-takeout-instruction data is received, and a decoding key is set to the backup card BC (lattice-pattern portion).

Figure 17:
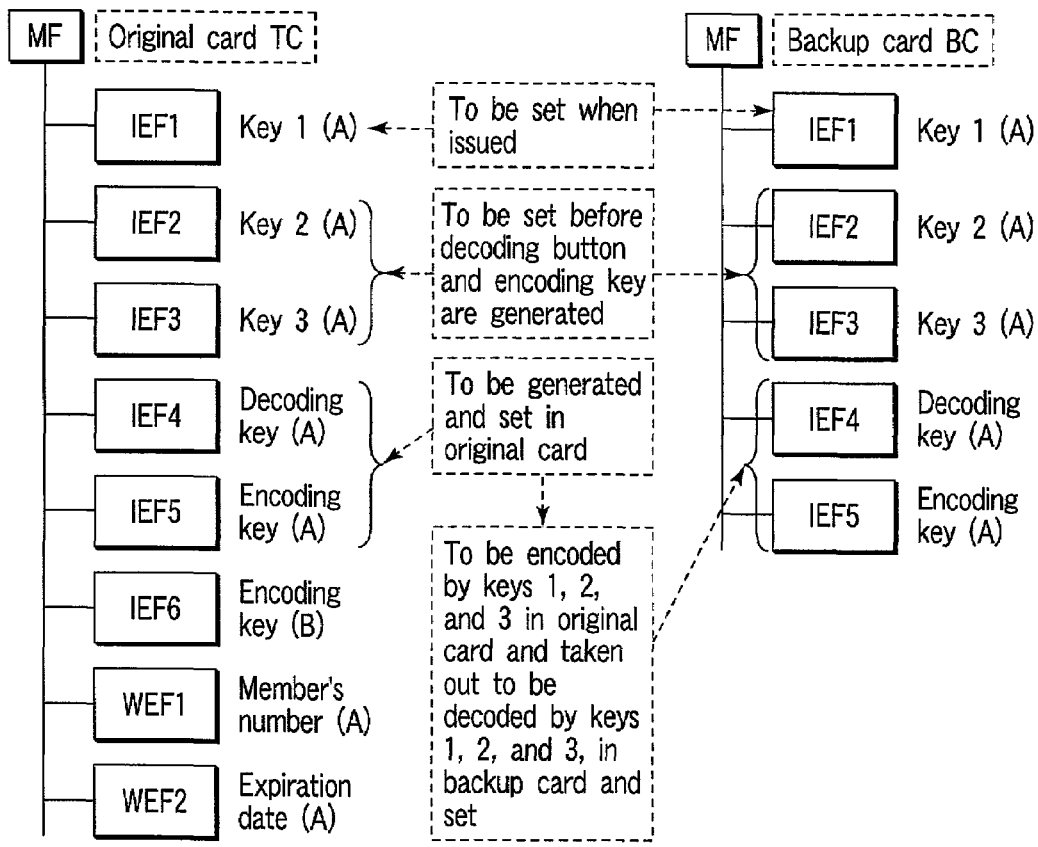
FIG. 17 is a schematic view for explaining states of generating an original card and a backup card.

FIG. 17 is a schematic view showing the state of generation of the original card TC and backup card BC described above.

That is, the key 1(A) is set to the IEF1 of the original card TC and the IEF1 of the backup card BC when the cards are issued. The key 2(A) and key 3(A) are set to the IEF2 and IEF3 of the original card TC and the IEF2 and IEF3 of the backup card BC before an encoding key and a decoding key are generated. A decoding key and an encoding key are generated and set in the IEF4 and IEF5 of the original card TC. The IEF4 and IEF5 of the original card TC are encoded by the keys 1(A), 2(A), and 3(A) of the IEF1, IEF2, and IEF3 of the original card TC and taken out. The encoded decoding key and encoding key are decoded by the keys 1(A), 2(A), and 3(A) of the IEF1, IEF2, and IEF3 of the backup card BC and set to the IEF4 and IEF5 of the backup card BC.

Then, the processing is described below in which the original card TC thus generated is broken, an electronic data file of the personal terminal unit 300 is decoded by the backup card BC, and encoded by a new original card. In the explanation below, a case of performing the processing by the personal terminal unit 300 is described. However, the processing can be also performed by the personal terminal unit 400.

As previously described by referring to FIG. 13, the personal terminal unit 300 connects with the card reader/writer 306a into which a new original card will be inserted and the card reader/writer 306b into which a backup card will be inserted. A newly-generated original card TC' is inserted into the card reader/writer 306a and the backup card BC is inserted into the card reader/writer 306b.

An input screen having the file name shown in FIG. 18 is displayed on the display 304 of the personal terminal unit 300. The file-name input screen displays an input area of a collation password necessary to perform encoding by a new card, an input area of a collation password necessary to perform decoding by a backup card, an additional button for inputting an electronic data file name encoded by the encoding key of the broken old original card TC, an area for displaying an electronic data file, an input end button for indicating end of input of a file name, and an end button for interrupting processing.

When input of an electronic data file name encoded by the encoding key of the broken old original card TC and input of a password are completed and input end is indicated by the input end button, it is started to decode an electronic data file in the backup card BC and encode an electronic data file in the new original card TC'.

Figure 19A:
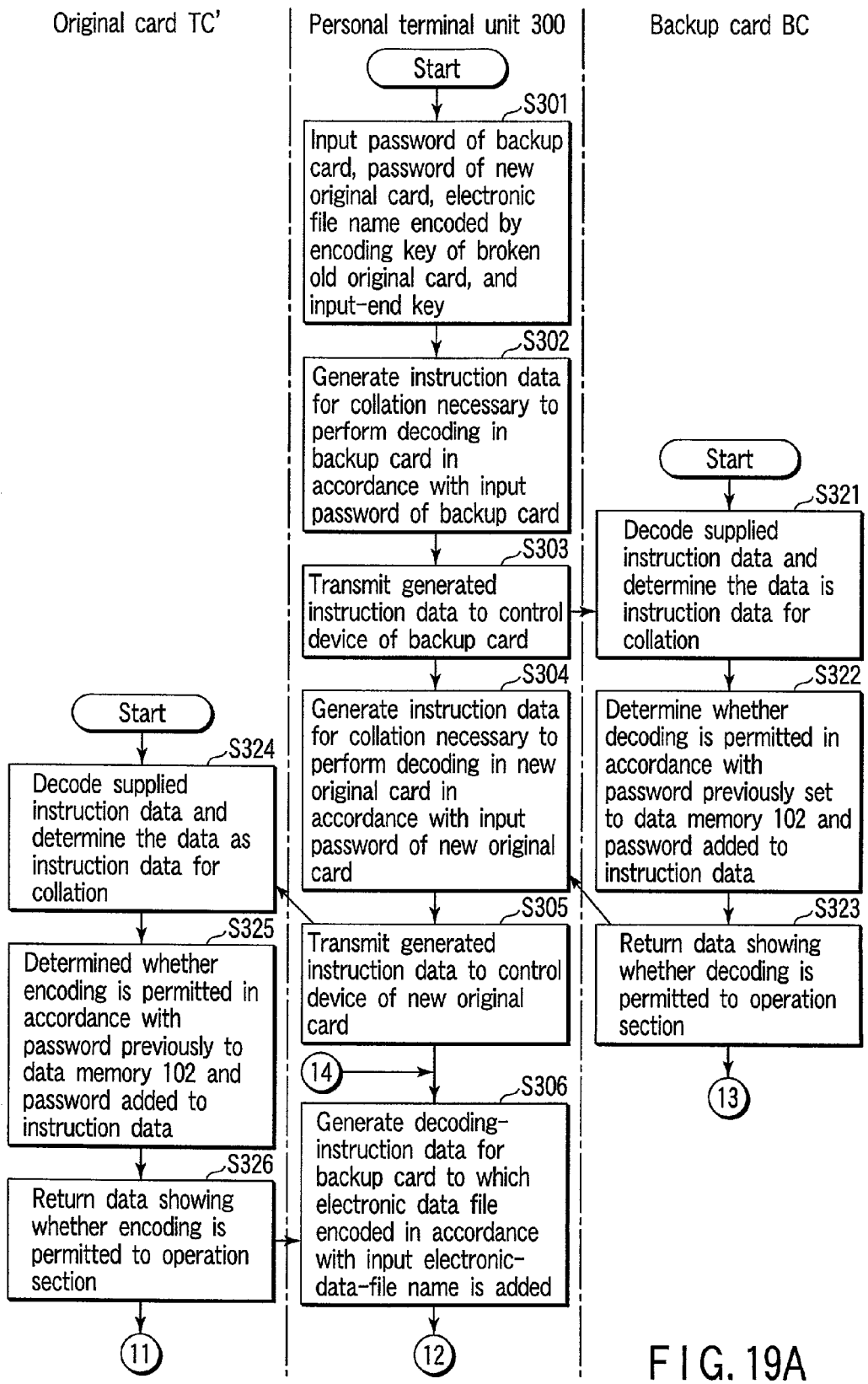
FIGS. 19A and 19B are flowcharts for explaining the decoding of an electronic data file by a backup card and the encoding of an electronic data file by a new original card.
Figure 19B:
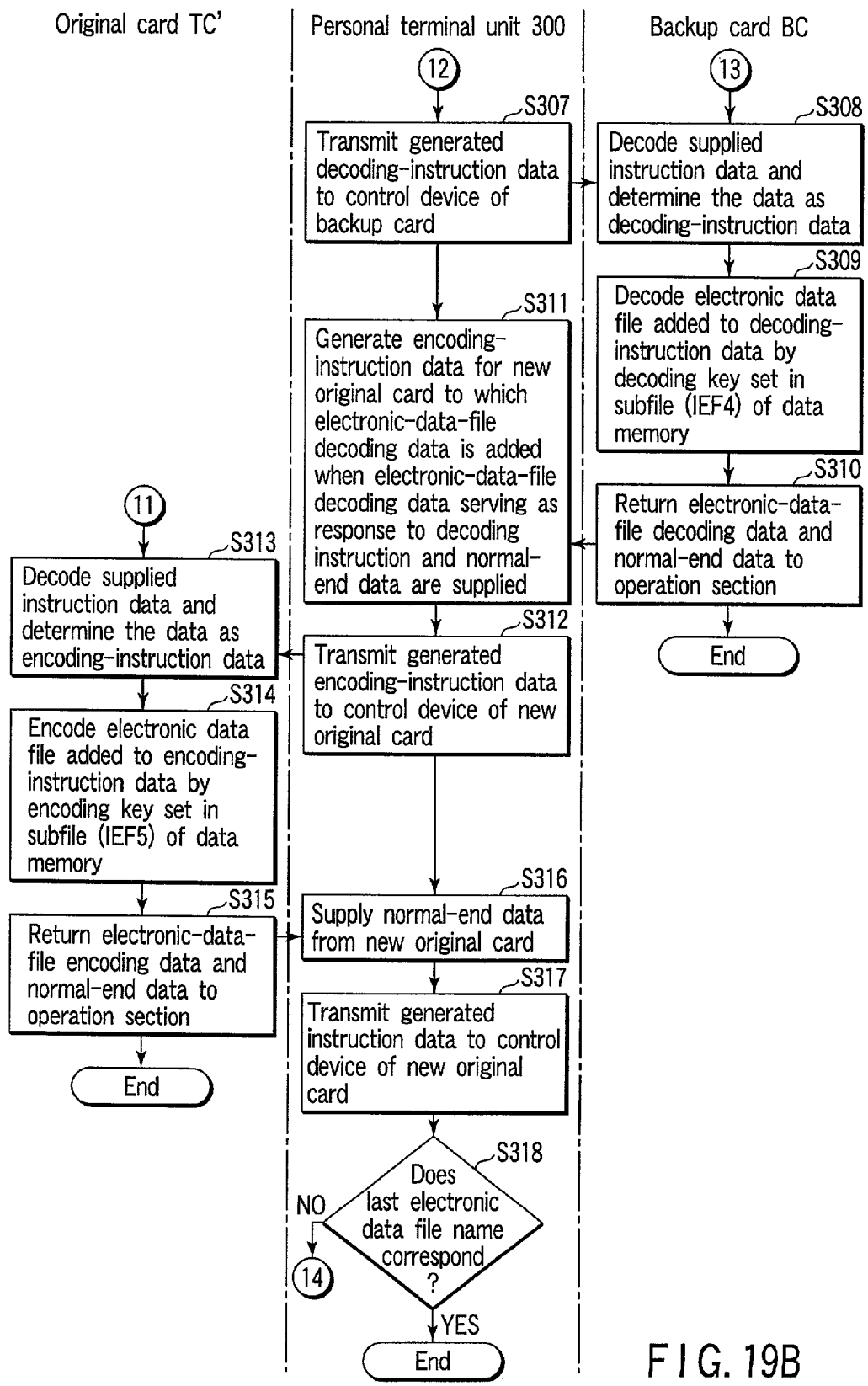

Hereafter, decoding of an electronic data file in the backup card BC and encoding of an electronic data file in the new original card TC' are described below by referring to the flowchart shown in FIG. 19B.

First, the electronic data file name encoded by the password of the backup card BC, the password of the new original card TC', and the encoding key of the old original card TC is input through operations of the keyboard 303 by an operator and then, an input end key is input (S301). According to the above input of them, the operation section 301a generates the instruction data for collation necessary to perform decoding in a backup card by the password of the input backup card BC (S302). Then, the operation section 301a transmits the generated instruction data to the control device 101 of the backup card BC through the card reader/writer 306b (S303).

Then, the control device 101 of the backup card BC decodes the supplied instruction data and when determining that the data is the data for collation (S321), determines whether decoding is permitted by the password previously set to the data memory 102 and the password added to the instruction data (S322). Then, the control device 101 returns the data showing whether decoding is permitted to the operation section 301a through the card reader/writer 306b (S323).

Then, when decoding is permitted, the operation section 301a generates the instruction data for collation necessary to perform decoding in the input new original card TC' in accordance with the password of the original card TC' (S304). Then, the operation section 301a transmits the generated instruction data to the control device 101 of the new original card TC' through the card reader/writer 306a (S305).

Then, the control device 101 of the new original card TC' decodes the supplied instruction data to determine whether encoding is permitted in accordance with the password previously set to the data memory 102 and the password added to the instruction data (S325). Then, the control device 101 returns the data showing whether encoding is permitted to the operation section 301a through the card reader/writer 306a (S326).

Then, when encoding is permitted, the operation section 301a generates the decoding-instruction data for the backup card BC to which an encoded electronic data file read out of the hard disk drive 302 in accordance with the above input electronic data file name (S306). Then, the operation section 301a transmits the generated decoding-instruction data to the control device 101 of the backup card BC through the card reader/writer 306b (S307).

Then, the control device 101 of the backup card BC decodes the supplied instruction data and when determining that the data is decoding-instruction data (S308), decodes an electronic data file added to the decoding-instruction data by a decoding key set to the subfile (IEF4) of the data memory 102 (S309). Then, the control device 101 returns the decoded data and normal-end data in the electronic data file to the operation section 301a through the card reader/writer 306b (S310). That is, the decoded data and normal-end data in the electronic data file are communicated to the terminal body 301.

Then, when the decoded data and normal-end data in the electronic data file serving as responses to the above decoding instruction are supplied, the operation section 301a generates encoding-instruction data for the new original card TC' to which the decoded data in the electronic data file is added (S311). Then, the operation section 301a transmits the generated decoding-instruction data to the control device 101 of the new original card TC' through the card reader/writer 306a (S312).

Then, the control device 101 of the new original card TC' decodes the supplied instruction data and when determining that the data is encoding-instruction data (S313), encodes the electronic data file added to the encoding-instruction data by an encoding key set to the subfile (IEF5) of the data memory 102 (S314). Then, the control device 101 returns the encoded data and normal-end data in the electronic data file to the operation section 301a through the card reader/writer 306a (S315). That is, the encoded data and normal-end data in the electronic data file are communicated to the terminal body 301.

When the normal-end data is supplied from the new original card TC' (S316), the operation section 301a stores the encoded electronic data file supplied from the new original card TC' in the hard disk drive 302 (S317). Then, the operation section 301a determines whether the encoded electronic data file received from the new original card TC' corresponds to the above input last electronic data file name (S318). Unless the data file is the last one, the operation section 301*a* repeats operations staring with step S306 and completes the processing when the last electronic data file appears.

Thus, according to the above embodiment, when taking out a decoding key and an encoding key generated in an IC card to an external unit, it is possible to safely take them out by encoding the keys by a plurality of other keys set in the IC card and then taking them out to the external unit. Moreover, by writing the taken-out decoding key and encoding key in another IC card, it is possible to easily generate a backup card.

Therefore, even if an IC card having a decoding key and an encoding key generated inside is broken, it is possible to reuse an electronic data file in which concealment and validity and of data are confirmed by the decoding key and encoding key in the broken IC card.

The above mentioned is more minutely described below by using a specific example. For example, in the system shown in FIG. 5, if the IC card 100*a* (original card TC) is broken while electronic mails are exchanged between the personal terminal units 300 and 400, the personal terminal unit 300 cannot read an electronic mail sent from the personal terminal unit 400 in the past or an electronic mail newly sent from the personal terminal unit 400.

However, by using the above-described backup card BC, it is possible for the personal terminal unit 300 to read an electronic mail sent from the personal terminal unit 400 in the past, read an electronic mail newly sent from the personal terminal unit 400 until a new IC card is obtained, and send an encoded electronic mail to the personal terminal unit 400.

For the above embodiment, a method is described which issues an IC card by previously generating the key 1 and storing the key 1 in a hard disk drive as a part of a personal database file. To further improve security, it is also preferable to use a method of automatically generating the key 1 by a dedicated key generator when issuing an IC card and setting the key 1 in the card. Thus, it is possible to further improve security because the key 1 is not stored in a hard disk drive.

Moreover, though a method for inputting the keys 2 and 3 into a screen is described, it is also permitted to use a method of automatically generating the keys 2 and 3 by a program of a personal computer or a dedicated key generator when issuing an IC card and setting the keys 2 and 3 in the card.

Furthermore, though a case is described in which three decoding-key-takeout-setting-instruction key groups are used, it is also permitted to use only the key 1, only the keys 1 and 2, or 4 keys or more.

Furthermore, by using a backup-card generation flag in the original card TC and using a group of keys, thereby setting the above flag when a decoding key and an encoding key are taken out to an external unit, and preventing the keys from being taken out to the external unit while the flag is set, it is possible to further improve the security.

Furthermore, it is permitted to set a key so that it cannot be taken out by preventing the key from being taken out of the key-group area in the data memory of the original card TC after generating the backup card BC.

Figure 20:
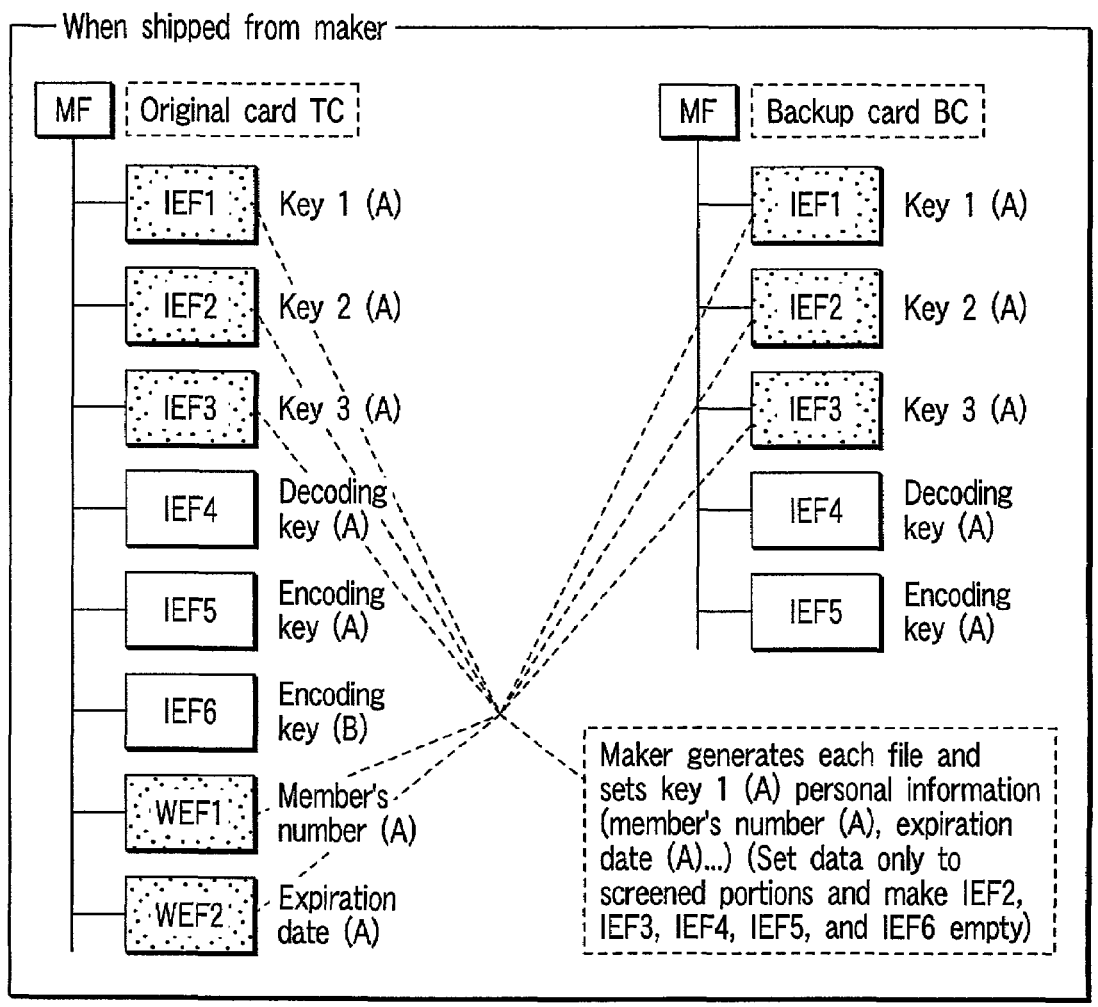
FIG. 20 is an illustration schematically showing internal states of data memories in an original card and a backup card when shipped from a card maker in another example.
Figure 21:
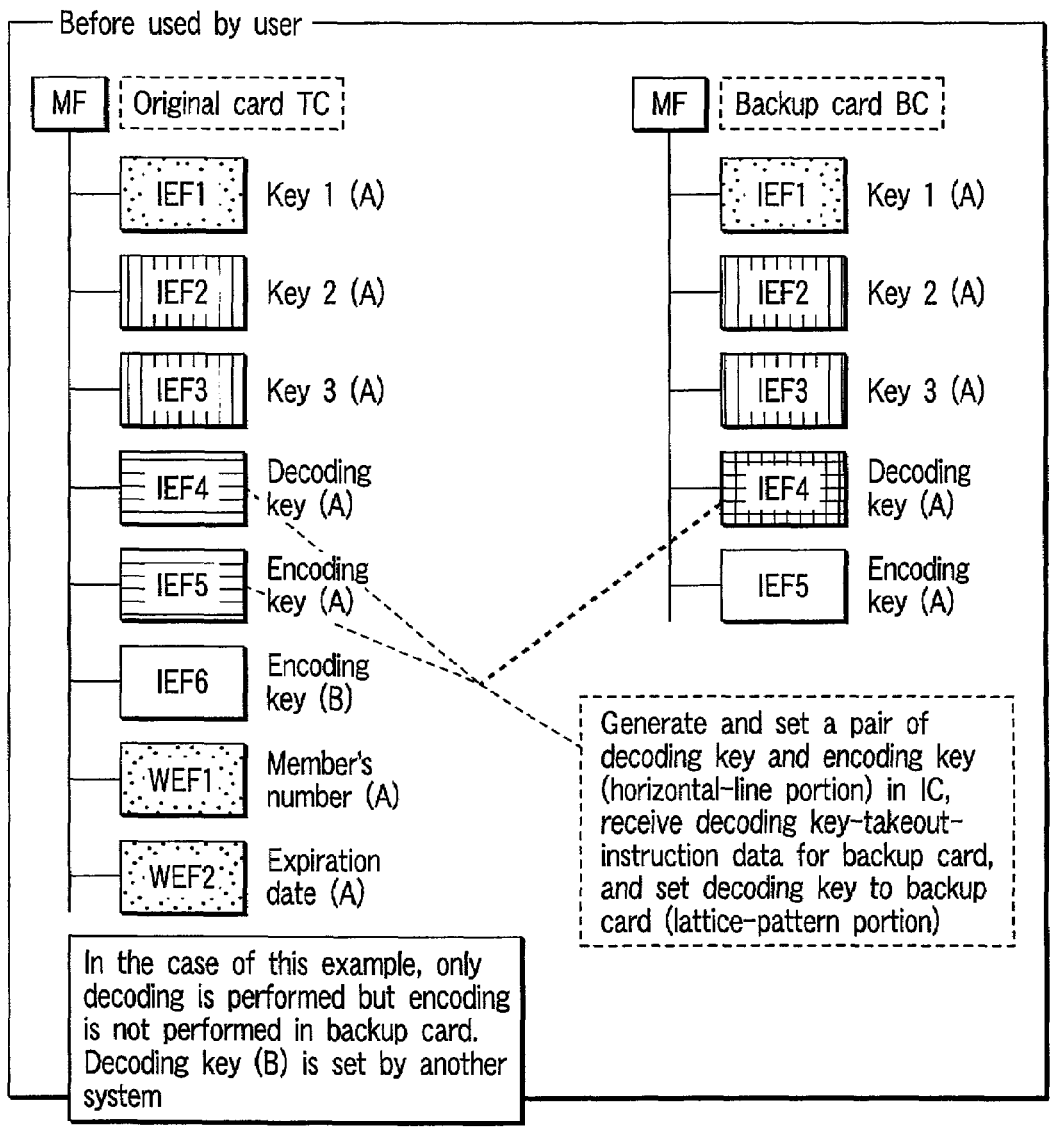
FIG. 21 is an illustration schematically showing internal states of data memories in an original card and a backup card before used by a user in still another example.

Furthermore, a method of setting the key 1 of a group of decoding-key takeout-and-setting instruction keys when a card is issued and the keys 2 and 3 when a backup card is generated is described. However, as shown in FIGS. 20 and 21, it is also permitted to set all the keys 1, 2, and 3 when a card is issued. That is, a card maker sets all the keys 1, 2, and 3. FIG. 20 shows internal states of data memories 102 of the original card TC and backup card BC when the cards are shipped from a card maker and FIG. 21 shows internal states of data memories 102 of the original card TC and backup card BC before they are used by a user.

Figure 22:
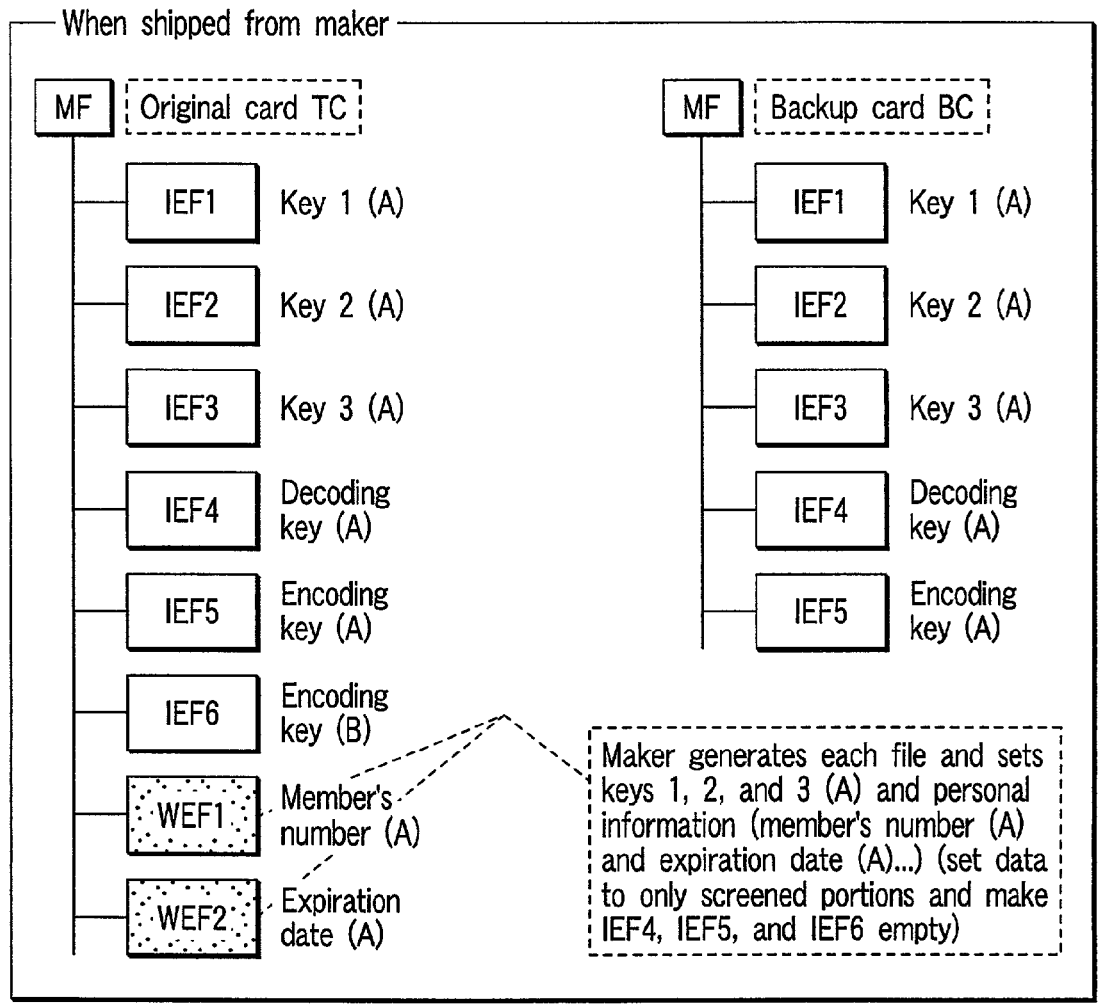
FIG. 22 is an illustration schematically showing internal states of data memories in an original card and a backup card when shipped from a card maker in still another example.
Figure 23:
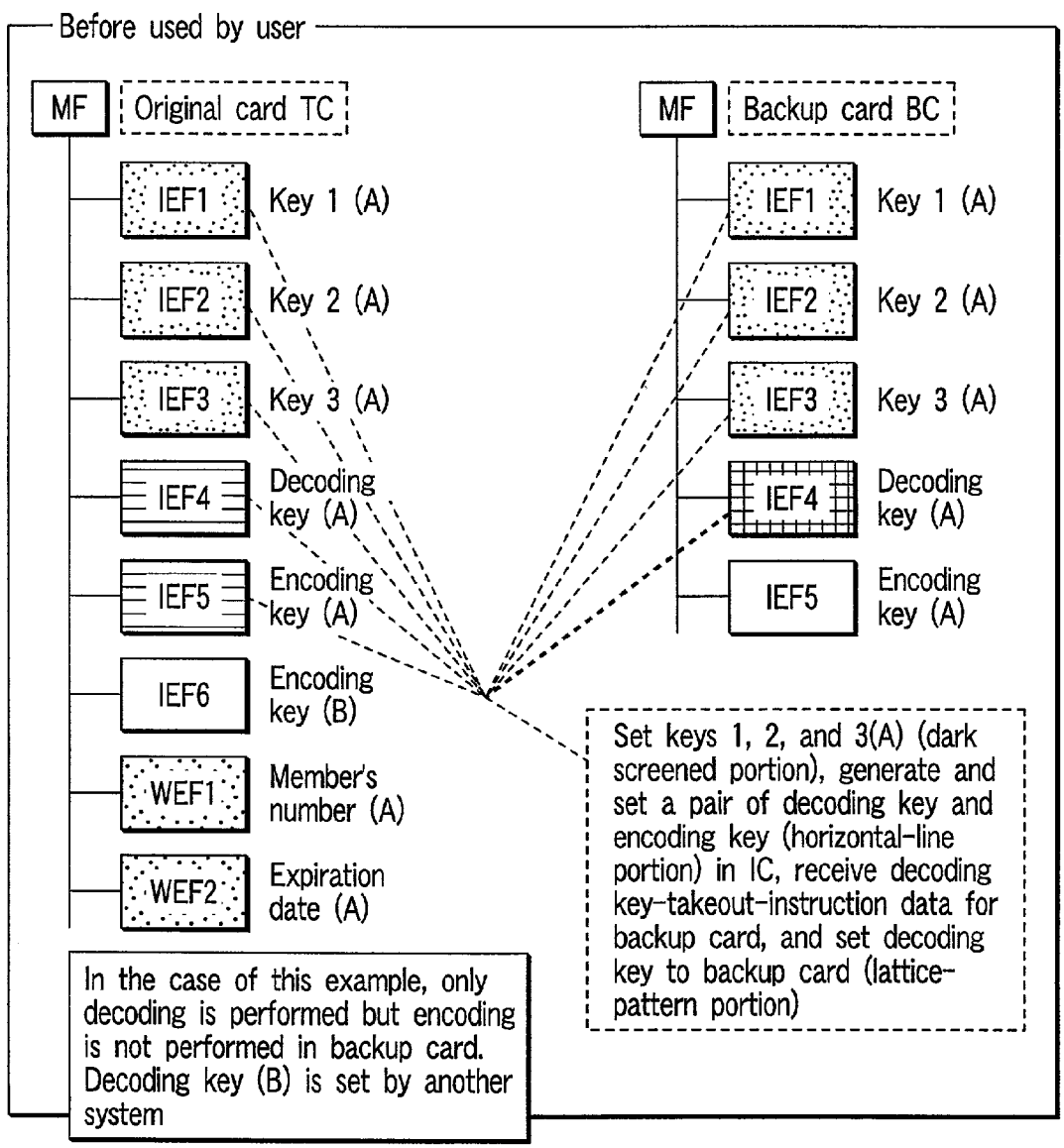
FIG. 23 is an illustration schematically showing internal states of data memories in an original card and a backup card before used by a user in still another example.

Moreover, a method of setting the key 1 of a group of decoding-key takeout-and-setting-instruction keys when a card is issued and the keys 2 and 3 when the backup card BC is generated is described. However, as shown in FIGS. 22 and 23, it is also permitted to set all the keys 1, 2, and 3 when the backup card BC is generated. FIG. 22 shows internal states of data memories 102 of the original card TC and backup card BC when shipped from a card maker and FIG. 23 shows internal states of data memories 102 of the original card TC and backup card BC before used by a user.

Figure 24:
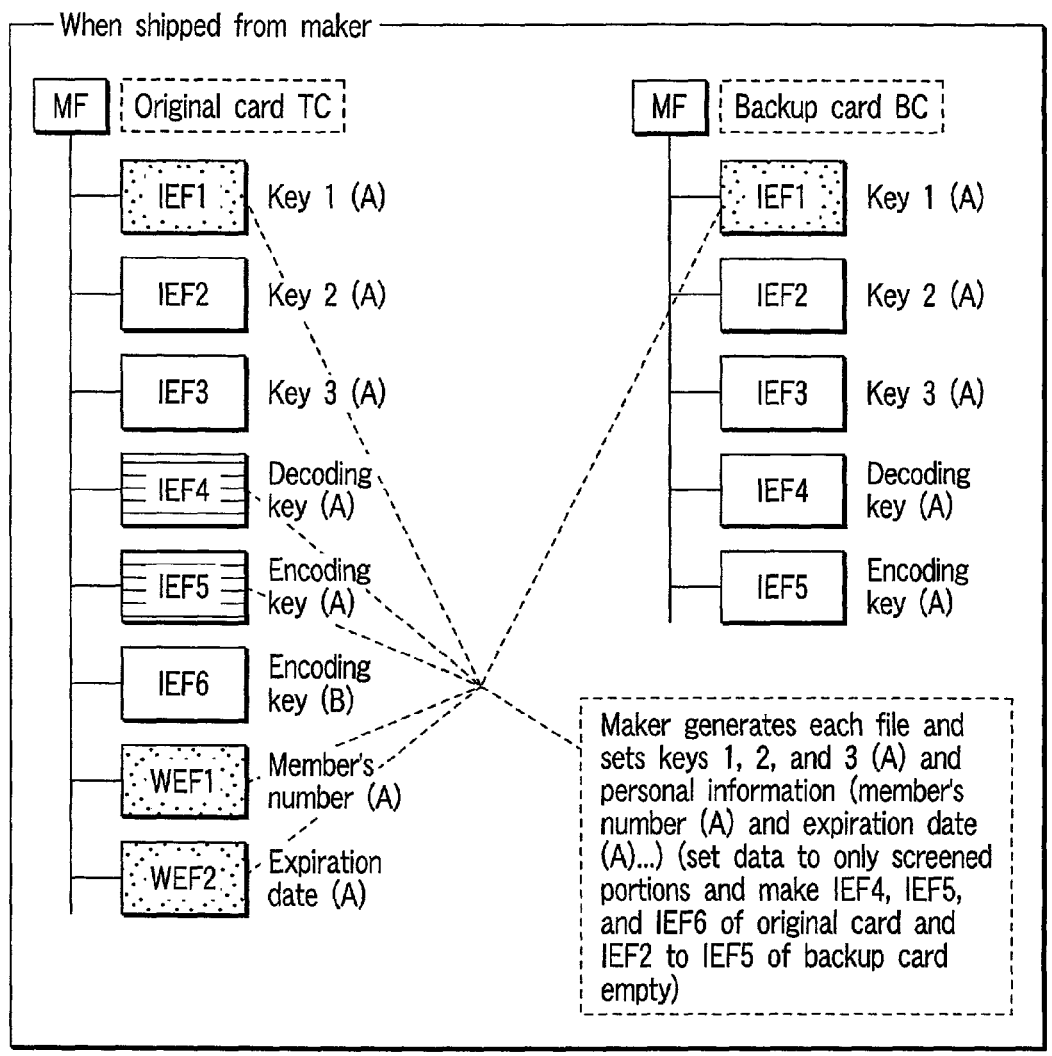
FIG. 24 is an illustration schematically showing internal states of data memories in an original card and a backup card when shipped from a card maker in still another example.
Figure 25:
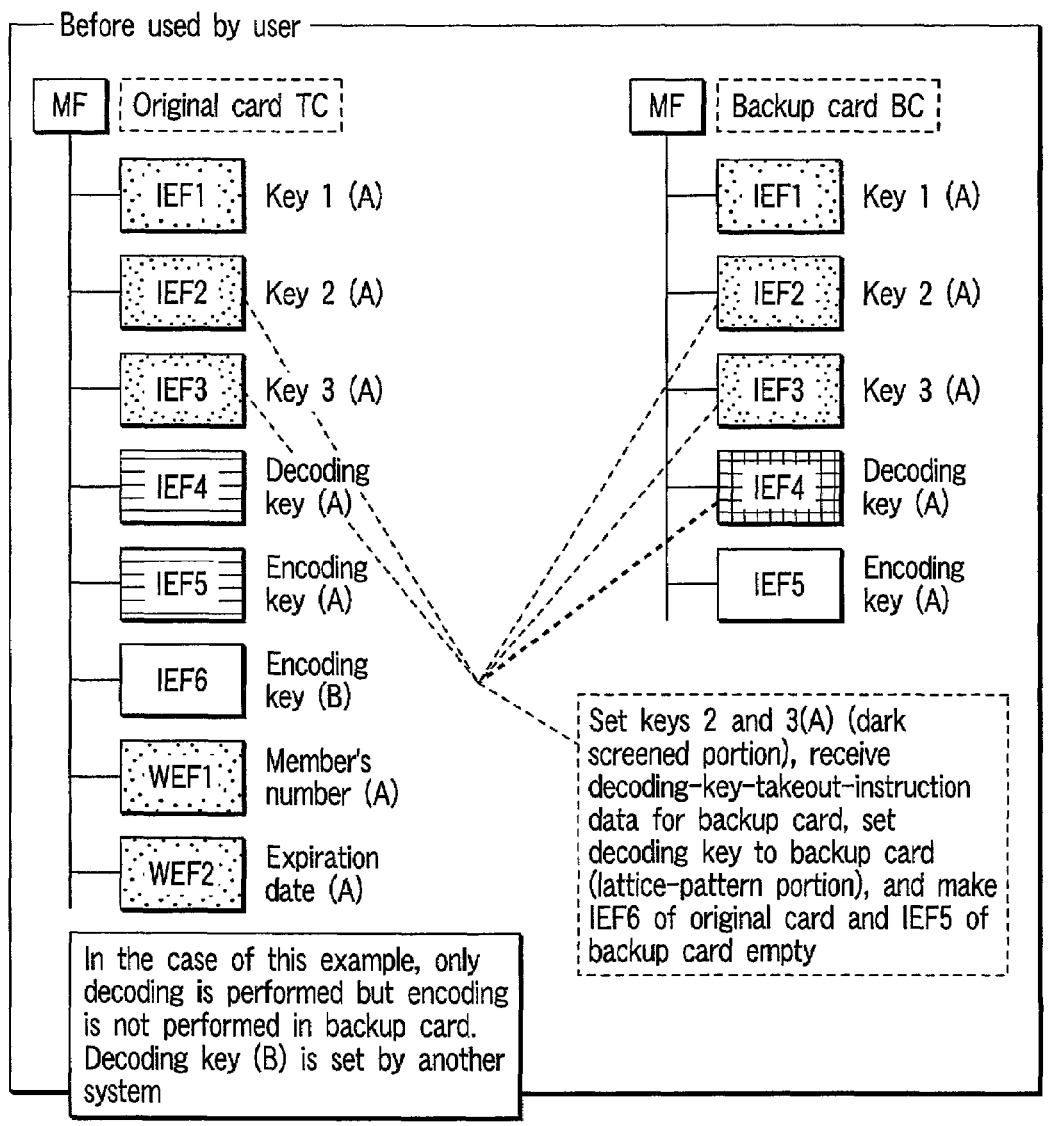
FIG. 25 is an illustration schematically showing internal states of data memories in an original card and a backup card before used by a user in still another example.

Furthermore, a method of generating a decoding key and an encoding key when generating the backup card BC is described. However, as shown in FIGS. 24 and 25, it is permitted to use a method of generating the keys when generating a card. That is, the keys are separately set by a card maker and a user. FIG. 24 shows internal states of data memories 102 of the original card TC and backup card BC when shipped from a card maker and FIG. 25 shows internal states of data memories 102 of the original card TC and backup card BC before used by a user.

Figure 26:
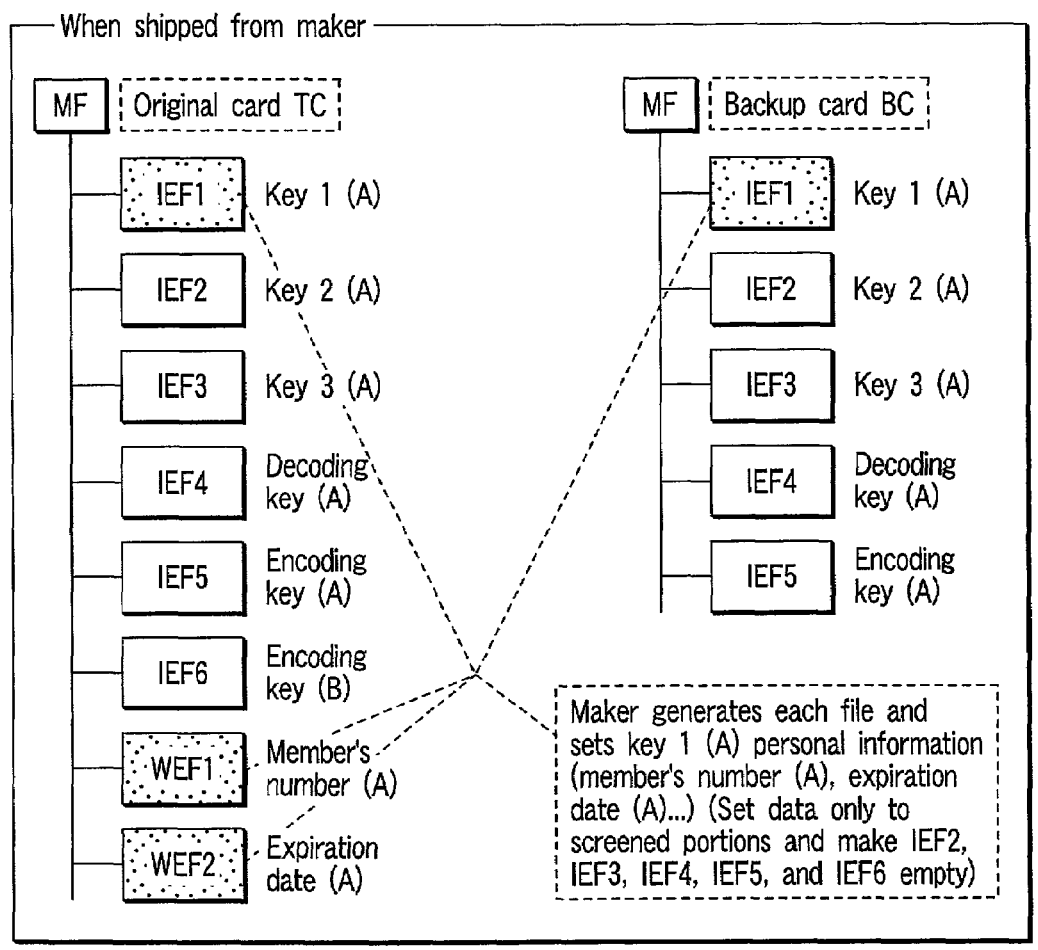
FIG. 26 is an illustration schematically showing internal states of data memories in an original card and a backup card when shipped from a card maker in still another example.
Figure 27:
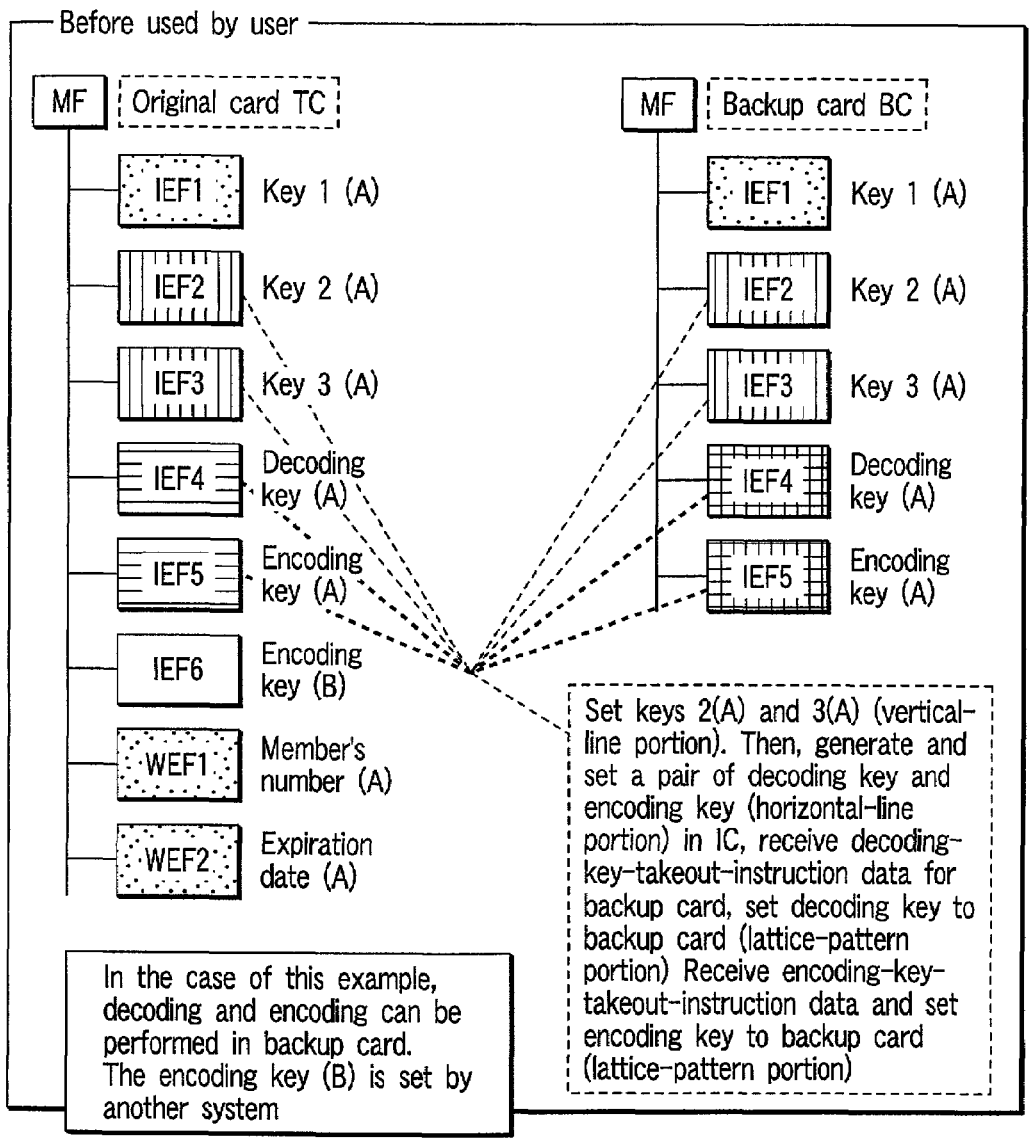
FIG. 27 is an illustration schematically showing internal states of data memories in an original card and a backup card before used by a user in still another example.
Figure 29A:
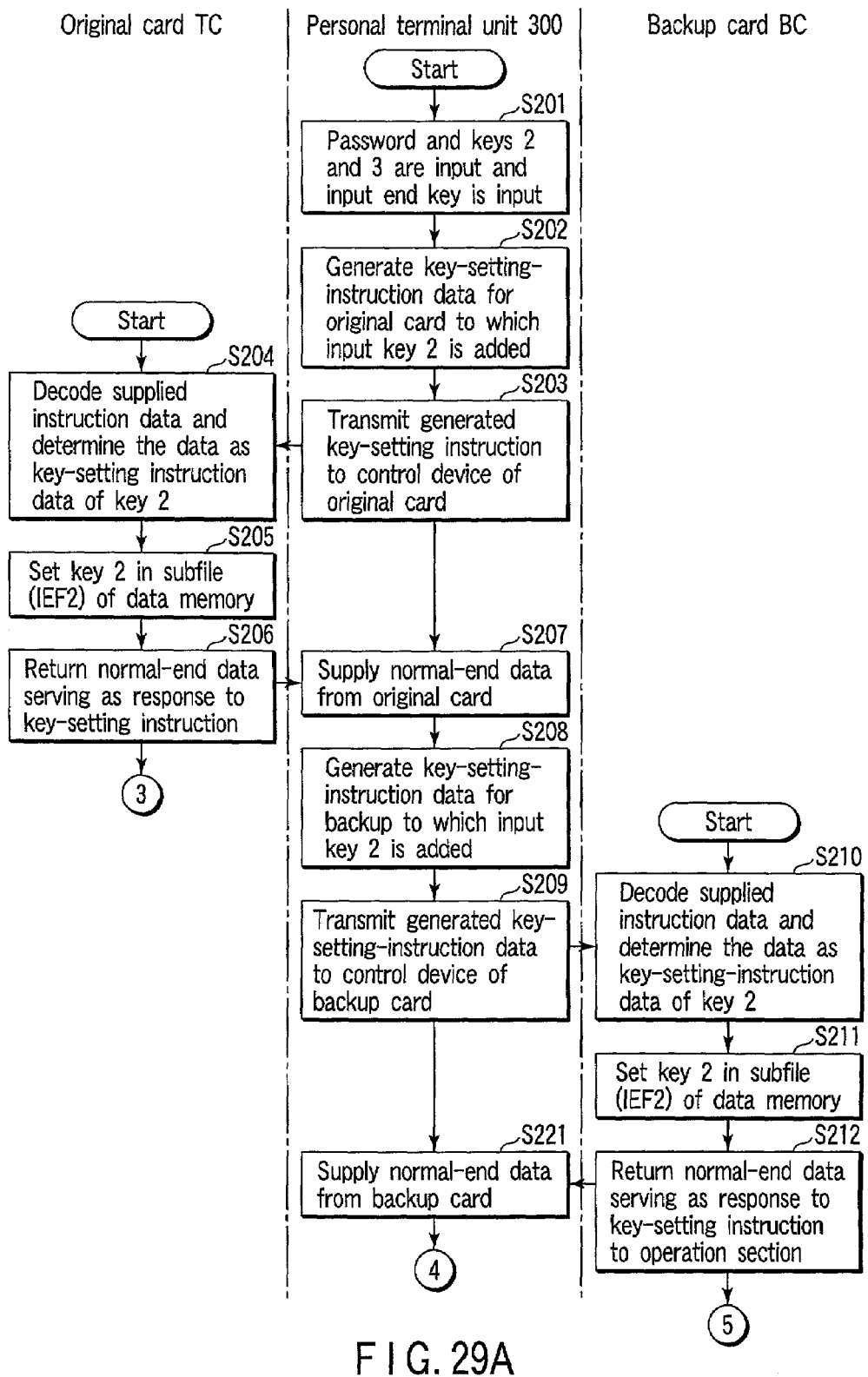
FIGS. 29A to 29D are flowcharts for explaining processes for setting keys to an original card and a backup card, setting an encoding key and a decoding key to the original card, taking out the decoding key from the original card, and setting the decoding key to the backup card.
Figure 29B:
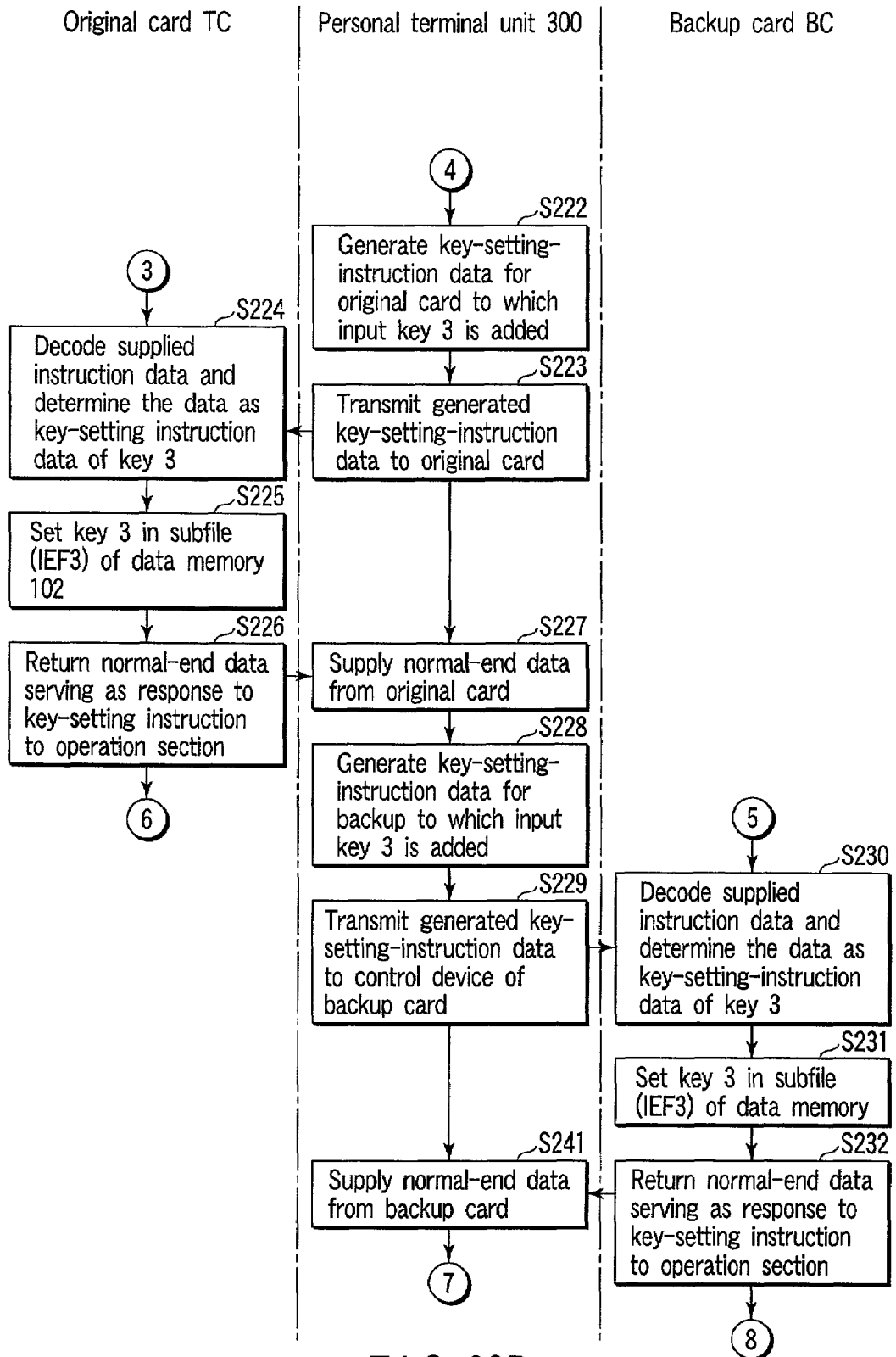
Figure 29C:
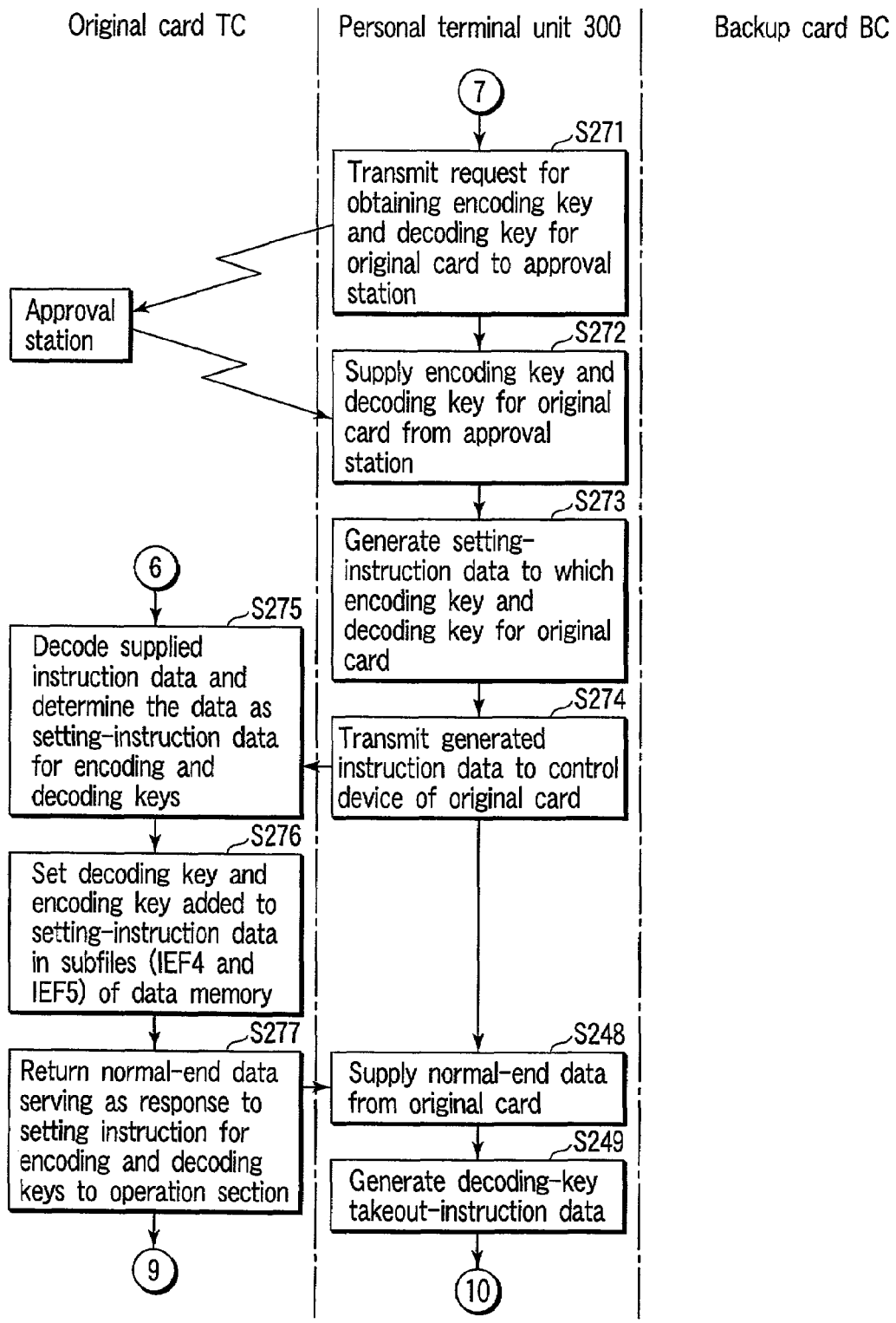
Figure 29D:
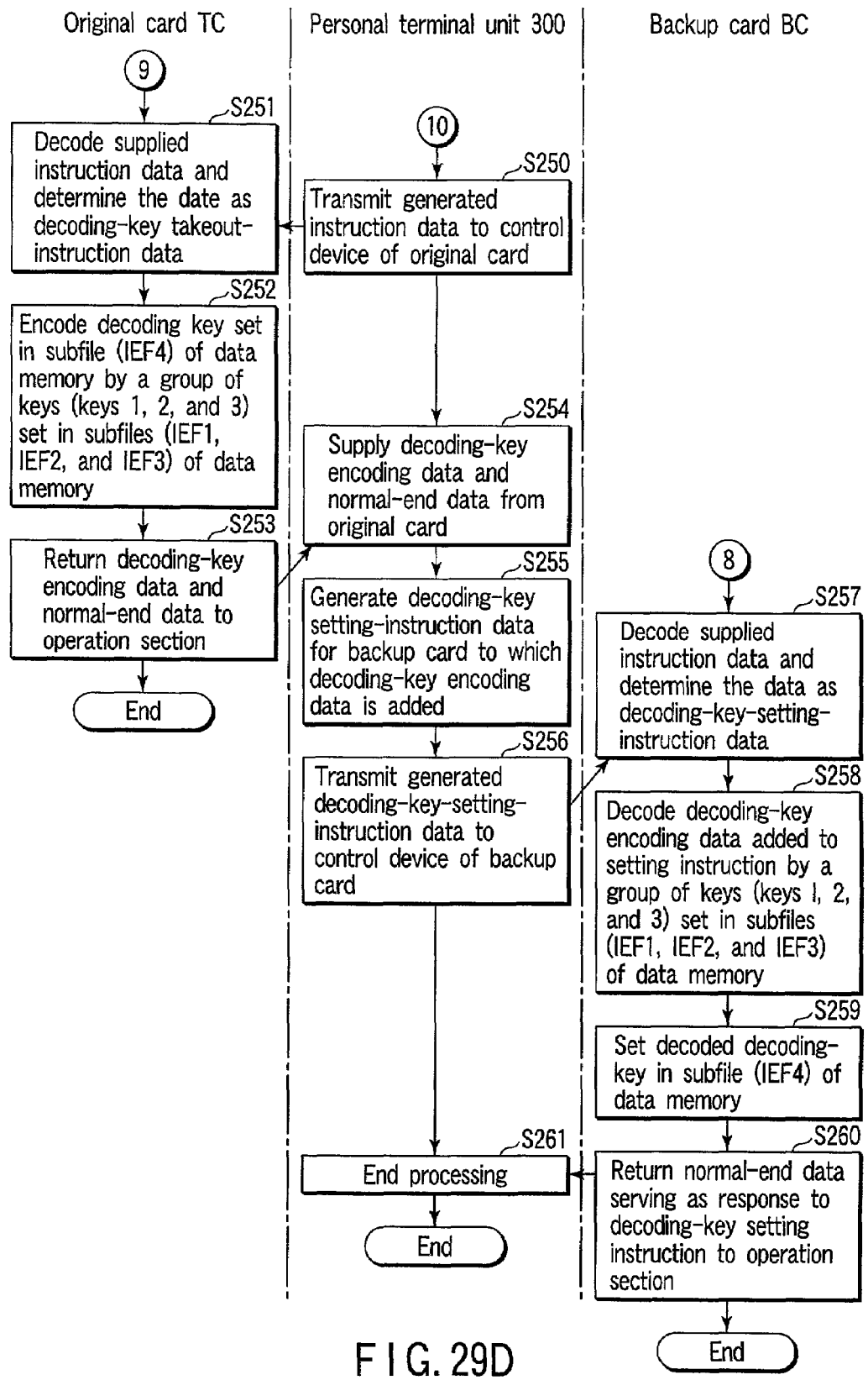

Furthermore, a method of setting only a decoding key to the backup card BC is described. However, it is also permitted to a method of setting even an encoding key to the backup card BC as shown in FIGS. 26 and 27 so that no trouble occurs in business before a new IC card reaches a user. FIG. 26 shows internal states of data memories 102 of an original card and the backup card BC when shipped from a card maker and FIG. 27 shows internal states of data memories 102 of the original card TC and backup card BC before used by a user.

Furthermore, a method of generating a decoding key and an encoding key in an IC card is described. However, as shown in FIG. 28, it is also permitted to set a decoding key and an encoding key to the original card TC by connecting the personal terminal units 300 and 400 to an approval station (service center for generating keys) 600 through the communication line 500 and downloading the decoding key and encoding key generated in the approval station 600 to, for example, the personal terminal unit 300.

In this case, the processing for setting keys to the original card TC and backup card BC, setting an encoding key and a decoding key to the original card TC, taking out the decoding key from the original card TC, and setting the decoding key to the backup card BC is shown by the flowchart in FIG. 29. The flowcharts in FIGS. 29A, 29B, 29C, and 29D are slightly different from those in FIGS. 15A, 15B, 15C, and 15D in the following points. That is, a step of obtaining a decoding key and an encoding key for an original card from the approval station 600 is added between steps S241 and S248 as described below.

That is, when normal-end data is supplied from the backup card BC (S241), the operation section 301*a* transmits a request for obtaining an encoding key and a decoding key for an original card to the approval station 600 (S271). Then, when an encoding key and a decoding key for an original card are supplied from the approval station 600 (S272), the operation section 301*a* generates setting-instruction data to which an encoding key and a decoding key for an original card is added in response to the transmission of the above request (S273). Then, the operation section 301*a* transmits the generated instruction data to the control device 101 of the original card TC (IC card 100*c*) through the card reader/writer 306*a* (S274).

Then, the control device 101 of the original card TC decodes the supplied instruction data and when determining that the data is setting-instruction data for an encoding key and a decoding key (S275), it sets (stores) the decoding key and encoding key added to the setting-instruction data in the subfiles (IEF4) and (IEF5) of the data memories 102 (S276). After setting the keys, the control device 101 returns the normal-end data serving as a response to the encoding-and-decoding-key setting instruction to the operation section 301*a* through the card reader/writer 306*a* (S277). That is, the normal-end data is communicated to the terminal body 301. Then, the above step 248 is started.

Figure 30:
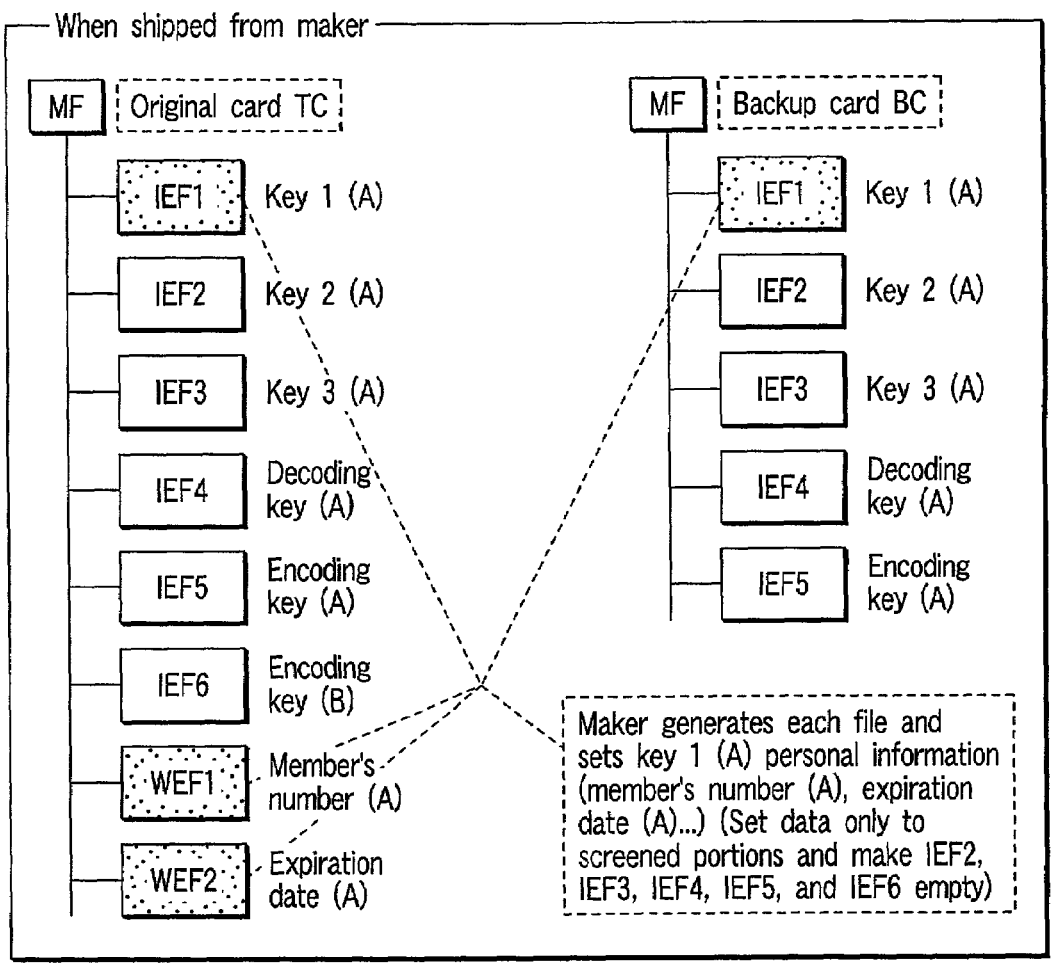
FIG. 30 is an illustration schematically showing internal states of data memories in an original card and a backup card when shipped from a card maker in still another example.
Figure 31:
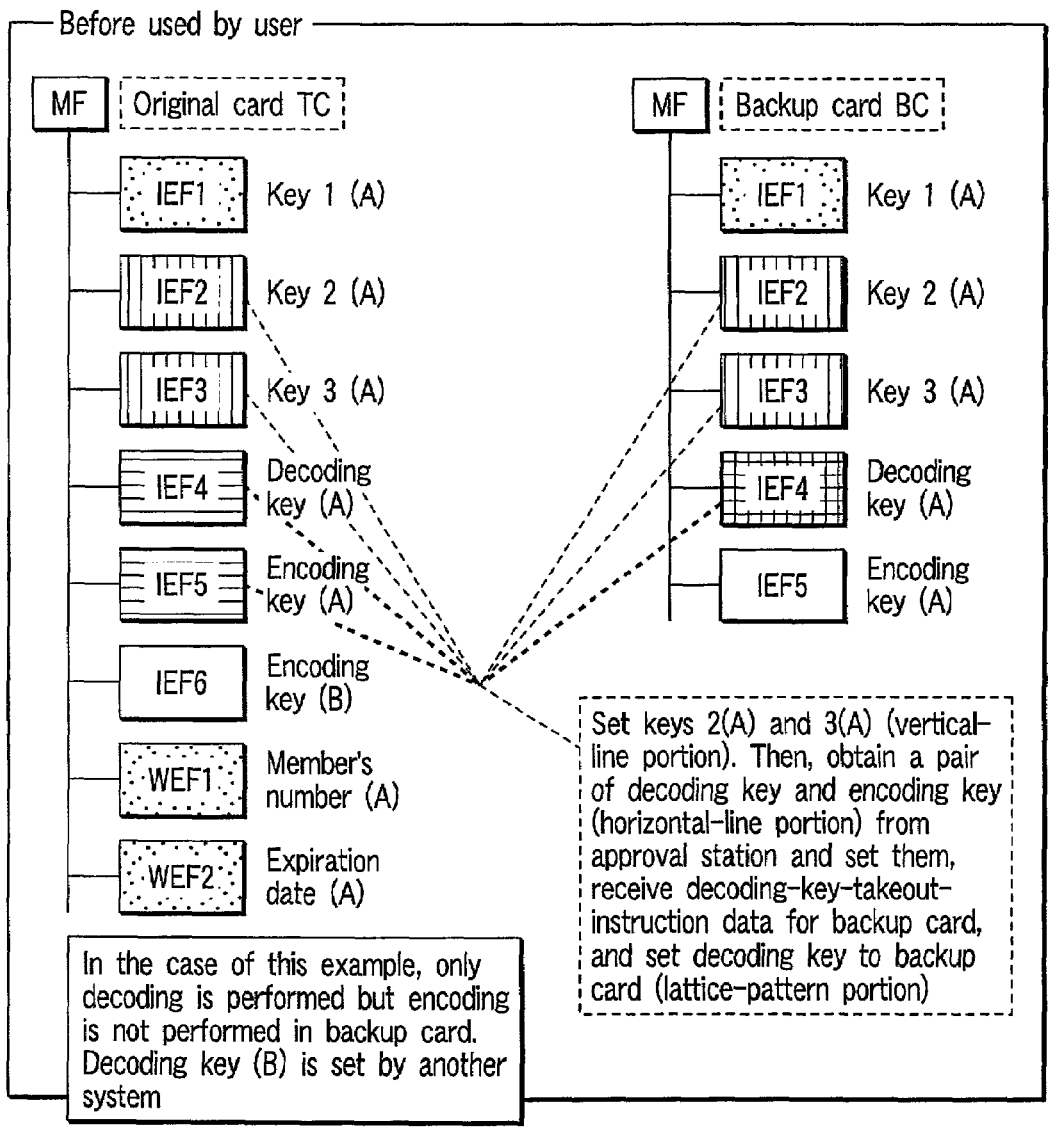
FIG. 31 is an illustration schematically showing internal states of data memories in an original card and a backup card before used by a user in still another example.

FIG. 30 shows internal states of data memories 102 of the original card TC and a backup card when shipped from a card maker and FIG. 31 shows internal states of data memories 102 of the original card TC and backup card BC before used by a user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card terminal unit comprising:
communication means for communicating data between two IC cards;
first key setting means for storing a plurality of second keys for encoding or decoding a first key in the two IC cards respectively by transmitting a key setting instruction to which the plurality of second keys are added to the two IC cards through the communication means;
confirmation means for confirming whether setting of the second key by the first key setting means properly ends;
key generation means for generating the first key for encoding or decoding data in the former IC card by transmitting a key generation instruction to one of the two IC cards through the communication means when it is confirmed by the confirmation means that setting of the second key properly ends;
key takeout means for taking out the first key generated in the former IC card generating the first key by the key generation means through the communication means by transmitting a key takeout instruction to the former IC card through the communication means, the generated first key being encoded by said plurality of second keys in the former IC card; and
second key setting means for storing the first key in the latter IC card, the first key being decoded by said plurality of second keys, by transmitting an encoding-key setting instruction to which the encoded first key taken out of the former IC card by the key takeout means is added to the latter IC card of the two IC cards.

2. An IC card duplication method using a first IC card to be duplicated in which at least a first key for encoding or decoding data is stored, a duplicating second IC card, and a terminal unit for handling these first and second IC cards, comprising:
a first step of transmitting a key-setting instruction to which a plurality of second keys for encoding or decoding the first key is added from the terminal unit to the first and second IC cards;
a second step of receiving the key-setting instruction transmitted from the terminal unit and storing the plurality of second keys added to the key-setting instruction in the first and second IC cards;
a third step of transmitting a key takeout instruction from the terminal unit to the first IC card;
a fourth step of receiving the key takeout instruction transmitted from the terminal unit, encoding the first key by the plurality of second keys stored in the second step, and transmitting the encoded first key to the terminal unit in the first IC card;
a fifth step of receiving the encoded first key transmitted from the first IC card and transmitting an encoding-key setting instruction to which the received encoded first key is added to the second IC card in the terminal unit; and
a sixth step of receiving the encoding-key setting instruction transmitted from the terminal unit, decoding the encoded first key added to the encoding-key setting instruction by the second key stored in the second step, and storing the decoded first key in the second IC card.

3. The IC card duplication method according to claim 2, wherein the key for encoding or decoding the data stored in the first IC card is generated in the first IC card in accordance with the key generation instruction input from the terminal unit.

4. The IC card duplication method according to claim 2, wherein the key for encoding or decoding the data stored in the first IC card is generated by an external unit and input through the terminal unit.

5. An IC card duplication system provided with a first IC card to be duplicated in which at least a first key for encoding or decoding data is stored, a duplicating second IC card, and a terminal unit according to claim 1 for handling these first and second IC cards, comprising:
key setting instruction transmitting means for transmitting a key setting instruction to which a plurality of second keys has been added from the terminal unit to the first and second IC cards;
second key storage means for receiving the key setting instruction transmitted from the terminal unit by the key setting instruction means and storing each of the plurality of second keys added to the key setting instruction in the first and second IC cards;
key takeout instruction transmitting means for transmitting a key takeout instruction from the terminal unit to the first IC card;
first key encoding means for receiving the key takeout instruction transmitted from the terminal unit by the key takeout instruction transmitting means and encoding the first key by the plurality of second keys stored by the second key storage means in the first IC card;
first key transmitting means for transmitting a first key encoded by the first encoding means to the terminal unit in the first IC card;
encoding key setting instruction transmitting means for receiving the first encoding key transmitted from the first IC card by the first key transmitting means, and transmitting the encoding key setting instruction to which the first encoding key which has been received, is added, to the second IC card in the terminal unit;
first key encoding means for receiving an encoding key setting instruction transmitted from the terminal unit by the encoding key setting instruction transmitting means, and for decoding the first encoded key added to the encoding key setting instruction by a plurality of second keys stored in the second key storage means in the second IC card, and
first key storage means for storing the first decoded key by the first encoding means in the second IC card.

* * * * *